US012716287B2

(12) United States Patent
Carson et al.

(10) Patent No.: US 12,716,287 B2
(45) Date of Patent: Aug. 25, 2026

(54) FRAMING SYSTEM FOR ASSISTING WITH INSTALLATION OF AN OBJECT WITHIN A WALL

(71) Applicant: Altus Group, Inc., Greenville, SC (US)

(72) Inventors: John M. Carson, Greenville, SC (US); Hagen Harker, Janesville, WI (US); Andrew LeVatte, St. John (CA)

(73) Assignee: Altus Group, Inc., Greenville, SC (US)

( * ) Notice: Subject to any disclaimer, the term of this patent is extended or adjusted under 35 U.S.C. 154(b) by 189 days.

(21) Appl. No.: 18/628,107

(22) Filed: Apr. 5, 2024

(65) Prior Publication Data

US 2024/0337148 A1 Oct. 10, 2024

Related U.S. Application Data

(60) Provisional application No. 63/494,357, filed on Apr. 5, 2023.

(51) Int. Cl.
*E06B 1/24* (2006.01)
*E06B 1/02* (2006.01)

(52) U.S. Cl.
CPC . *E06B 1/24* (2013.01); *E06B 1/02* (2013.01)

(58) Field of Classification Search
CPC ... E06B 1/24; E06B 1/32; E06B 1/325; E06B 1/36; E06B 1/52; E06B 1/60; E06B 1/56; E06B 1/00; E06B 1/02; E06B 1/04
See application file for complete search history.

(56) References Cited

U.S. PATENT DOCUMENTS

| | | | |
|---|---|---|---|
| 3,994,470 A | 11/1976 | Nakada | |
| 4,065,540 A | 12/1977 | Okami | |
| 5,155,956 A | 10/1992 | Norment et al. | |
| 5,575,870 A | 11/1996 | Suenaga et al. | |
| 6,088,985 A | 7/2000 | Clark | |
| 7,552,962 B2 * | 6/2009 | Habering ............ | B60R 16/0215 296/155 |

(Continued)

FOREIGN PATENT DOCUMENTS

| | | | |
|---|---|---|---|
| AT | 340 660 B | 12/1977 | |
| CN | 203383360 U | 1/2014 | |

(Continued)

OTHER PUBLICATIONS

David S. Mulcahy, U.S. Appl. No. 63/171,923 for "Snow Shoe", filed Apr. 7, 2021.

(Continued)

*Primary Examiner* — Chi Q Nguyen
(74) *Attorney, Agent, or Firm* — ALSTON & BIRD LLP

(57) ABSTRACT

Various devices, assemblies, components, systems, and methods are provided relating to a framing system. An example framing system may include a lower frame assembly, an upper frame assembly, and side frame assemblies. The framing system may be secured to a portion of a concrete wall while the wall is still partially wet to create a seal between the wall and the system. The lower frame assembly, the upper frame assembly, and the side frame assembly may be configured to assist with the installation of an object (e.g., a window, a door, etc.) within a precast concrete wall (e.g., sandwich wall, etc.) and/or architectural cladding element.

4 Claims, 21 Drawing Sheets

100

(56) References Cited

U.S. PATENT DOCUMENTS

| | | | | |
|---|---|---|---|---|
| 8,051,775 | B2 * | 11/2011 | Henderson | F42B 3/00 102/275.6 |
| 8,096,094 | B2 | 1/2012 | Mees | |
| 8,495,843 | B1 * | 7/2013 | Horneland | E06B 1/02 52/745.15 |
| 10,844,617 | B1 * | 11/2020 | Ahmad | E04G 15/02 |
| 11,136,148 | B2 * | 10/2021 | Rehbein | A61J 1/05 |
| 11,834,823 | B2 | 12/2023 | Mulcahy | |
| 2001/0005962 | A1 * | 7/2001 | Emek | E06B 3/308 52/204.63 |
| 2010/0000177 | A1 | 1/2010 | Sladojevic | |
| 2010/0043343 | A1 | 2/2010 | Mees | |
| 2010/0199591 | A1 * | 8/2010 | Sonderkaer | E06B 3/66 52/656.6 |
| 2011/0296777 | A1 * | 12/2011 | Matta | E06B 1/60 52/745.15 |
| 2013/0104472 | A1 * | 5/2013 | Carolan | E06B 1/04 52/483.1 |
| 2013/0318898 | A1 * | 12/2013 | Way | E04B 2/8635 52/425 |
| 2014/0130431 | A1 * | 5/2014 | Stewart | E06B 1/02 52/215 |
| 2015/0096251 | A1 * | 4/2015 | McCandless | E04B 1/625 52/404.3 |
| 2021/0396069 | A1 * | 12/2021 | Vansickle | E06B 3/26 |
| 2022/0325518 | A1 | 10/2022 | Mulcahy | |
| 2023/0265649 | A1 | 8/2023 | Mulcahy | |
| 2024/0102275 | A1 | 3/2024 | Mulcahy | |

FOREIGN PATENT DOCUMENTS

| | | | |
|---|---|---|---|
| CN | 105089426 | A | 11/2015 |
| CN | 204877022 | U | 12/2015 |
| CN | 206016548 | U | 3/2017 |
| CN | 107165540 | A | 9/2017 |
| CN | 111946201 | A | 11/2020 |
| NL | 1 030 899 | C2 | 7/2007 |
| WO | WO 2010/146221 | A1 | 12/2010 |
| WO | WO 2022/265584 | A1 | 12/2022 |

OTHER PUBLICATIONS

Edward D. Losch et al., "State of the Art of Precast/Prestressed Concrete Sandwich Wall Panels," PCI Committee Report, Second Edition, 1-63, (1997).

Notification of Transmittal of the International Search Report and the Written Opinion of the International Searching Authority, or the Declaration received for International Application No. PCT/US2024/023317, mailed on Jul. 11, 2024, 13 pages.

DZ Corporation, "DZ Precast Solutions", retrieved from the Internet at URL: <https://dzblock.com/dz-precast> on Mar. 11, 2026, 2 pages.

Image of Kawneer NX-3800 fixed window, believed to be publicly available at least as of 2013.

Kawneer, "Architectural Fixed Window," Series NX-3800, 1-2, (2013).

Kawneer, "NX-3800 Windows (Fixed)," 085113 Aluminum Windows, EC 97909-163, Guide Specs, SPCE361EN, 1-6, (Jan. 2024).

Kawneer, "NX3800 Window Drawings," PRELIM, 1 page, (May 23, 2025).

Kawneer, "AA® 4325 Series Windows Architectural Detail Manual," EC 97911-350, 1-62, (Dec. 2025).

Youtube, "DZ Precast House Assembly," https://www.youtube.com/watch?v=ptMFvobl-q0, 2 pages, (Mar. 10, 2025).

* cited by examiner

500A

FRAMING SYSTEM FOR ASSISTING WITH INSTALLATION OF AN OBJECT WITHIN A WALL

CROSS-REFERENCE TO RELATED APPLICATIONS

This application claims the benefit of and priority to U.S. Provisional Application No. 63/494,357, filed Apr. 5, 2023, entitled "A FRAMING SYSTEM FOR ASSISTING WITH INSTALLATION OF AN OBJECT WITHIN A WALL," the disclosure of which is incorporated herein by reference in its entirety.

BACKGROUND

Typical framing systems for an installation of an object within a precast concrete wall required significant labor and provide little adjustability. For example, with regards to installing windows into precast sandwich walls and architectural cladding structures, which can be formed either horizontally or vertically, the walls are formed with blocking or formwork that provide a future opening in the wythes for the window. Once the wall is shipped to the jobsite, the window is then typically installed by a glazer. This requires placing, securing, and sealing the window in an exposed environment, and often while working on ladders or lifts in limited space, service and access environments.

The framing systems as provided herein make the installation of an object, such as a window, by a precaster or concrete products manufacturer within a wall easier by making it simpler for an installer to align and secure the window within an opening, while improving the adjustability of the window, and increasing the quality of a seal between a window and the wall. Applicant has identified many deficiencies and problems associated with existing methods, apparatuses, and systems. Through applied effort, ingenuity, and innovation, these identified deficiencies and problems have been solved by developing solutions that are in accordance with the embodiments of the present disclosure, examples of which are described in detail herein.

BRIEF SUMMARY

Embodiments of the present disclosure provide methods, apparatuses, systems, and/or the like for providing advantages with installation of an object, such as a window, a door, etc., within a wall. In accordance with one aspect of the present disclosure, a framing system for providing advantages for an installer when installing a window within an opening of a wall is provided. The framing system of the present embodiment allows for objects to be easily installed by a precast wall manufacturer or an architectural cladding manufacturer in a factory or by an installer at a jobsite. The framing system further makes attaching a concrete wall (e.g., a sandwich wall, etc.) to an external structure (e.g., a curtain wall, etc.) easier.

In various embodiments, the system can be fitted within or on a mold framework and blocking for a wall before pouring the concrete, which allows the concrete, when poured, to flow under/around the framing system securing the system in place. In other embodiments, the system can be installed into a concrete wall (e.g., sandwich wall, etc.) while a portion of the wall is still at least partially wet. The framing system may comprise: a lower frame assembly, an upper frame assembly, and two side frame assemblies. In various embodiments, the lower frame assembly may further comprise a lower frame portion and a lower capping portion, the upper frame assembly may further comprise an upper frame portion and an upper capping portion, and the side frame assemblies may further comprise a side frame portion and a side capping portion.

The lower frame assembly, the upper frame assembly, and the side frame assemblies are configured to secure to a portion of the wall and receive one or more objects such as windows or doors once secured to the wall. The object may be secured to the lower frame portion, the upper frame portion, and the side frame portion, respectively, with one or more capping portions. A threaded fastener may be used to secure the object within the frame portions and the capping portions.

BRIEF DESCRIPTION OF THE DRAWINGS

The following drawings are illustrations of a particular embodiments of the present disclosure and thereof do not limit the scope or spirit of the present disclosure. The drawings are not necessarily drawn to scale, nor are they necessarily are intended for use in conjunction with the explanation in the following detailed description.

DETAILED DESCRIPTION OF EXAMPLE EMBODIMENTS

Some embodiments of the present disclosure of the present invention will be described in a more detailed manner hereinafter with reference to the accompanying drawings some embodiments of the invention are shown. Reference numbers refer to elements throughout the drawings. Multiple embodiments of the current invention may be embodied in different forms and should not be limited to the embodiments set forth herein. Rather, these embodiments are provided so that this disclosure will satisfy applicable legal requirements.

As used herein, terms such as "front," "rear," "top," etc. are used for explanatory purposes in the examples provided below to describe the relative positions of certain components or portions of components. As used herein, the term "or" is used in both the alternative and conjunctive sense, unless otherwise indicated. The term "along," and similarly utilized terms, means near or on, but not necessarily requiring directly on an axis or other referenced location.

The terms "approximately," "generally," and "substantially" refer to within manufacturing and/or engineering design tolerance for the corresponding materials and/or elements unless otherwise indicated. The use of such term is inclusive of and is intended to allow independent claiming of specific values listed. Thus, use of any such aforementioned terms, or similarly interchangeable terms, should not be taken to limit the spirit and scope of embodiments of the present invention. As used in the specification, the singular form of "a," "an," and "the" include plural references unless otherwise stated. The terms "includes" and/or "including," when used in the specification, specify the presence of stated features, elements, and/or components, and/or groups thereof.

As used herein, the phrases "in one embodiment," "according to one embodiment," "in various embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment. As used herein, the terms "example," "exemplary," and the like are used to "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion. Some components can be omitted from one or more figures or shown in dashed line for visibility of the underlying components.

FIGS. 1-5 depict exemplary views of example framing systems and portions thereof in accordance with various embodiments of the present disclosure.

Figure 1:
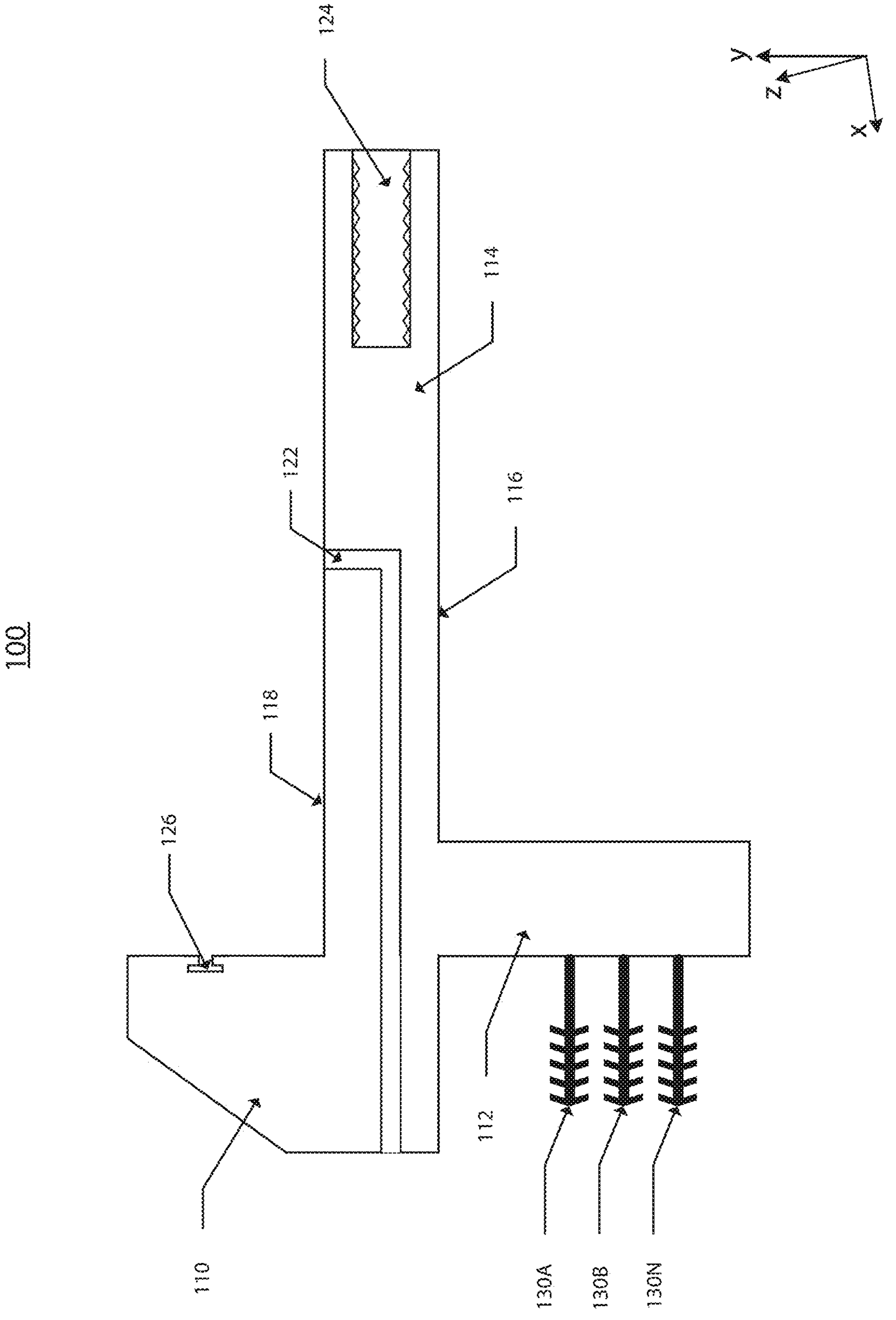
FIG. 1 illustrates a side cross-sectional view of an example lower frame portion in accordance with various embodiments of the present disclosure.

FIG. 1 depicts a side cross-sectional view of an example lower frame portion 100, which in the depicted embodiment, may include a front section 110, a securing section 112, and a body section 114. In the depicted embodiments, the front section 110 faces the outside (e.g., the exterior of a building) and the end of the body section 114 faces the inside. In some embodiments, the lower frame portion 100 may be constructed/molded as single piece, wherein the lower frame portion 100 may be constructed/molded out of plastic, fiberglass, hybrid, coextrusion, composite, and/or any other material suitable. The lower frame portion may also be made from one or more extruded aluminum sections or any other suitable material applicable.

In various embodiments, the front section 110 and/or the securing section 112 may be solid sections, while the body section 114 may be at least partially hollow. The body section 114 further defines a bottom surface 116 and a top surface 118 of the lower frame portion 100. In various embodiments, the securing section 112 may comprise one or more d connectors 130A, 130B, 130N (collectively "130") to assist with securing the lower frame portion 100, at least partially, to a portion of a wall. The integrated connectors 130 may be constructed/molded as a part of the securing section 112. The integrated connectors 130 may be constructed/molded out of the same material as the lower frame portion 100, such that, the lower frame portion 100 and the integrated connectors 130 can be constructed/molded as a single piece. The integrated connectors 130 can comprise a shape like the ones depicted in the figures, e.g., a cylindrical body with at least one reverse angled chevrons extending from the body. In other embodiments, the integrated connector 130 may comprise a simpler construction, such that, the integrated connector 130 may have a cylindrical body with at least one protrusion at least partially orthogonal to the cylindrical body. In various embodiments, the integrated connector 130 may extend continuously (not depicted) along the length (e.g., in the depicted embodiment, along the z-axis) of the lower frame portion 100. The continuous integrated connector 130 may provide a continuous mechanical connection with at least a portion of a wall and/or may act like a leak path arrestor in an instance, in which, a seal, caulk, a gasket, or the like is not properly maintained and fails allowing water to enter the framing system.

With further reference to FIG. 1, a front section 110 may further define a channel 126. The channel 126 receives one or more gaskets before and/or while an object is being installed as will be explained below. The lower frame portion 100 may further comprise at least one drain channel 122 and/or at least one fastener bore 124. The drain channel 122 may comprise one or more openings along a top surface 118 of the body section 114 and extends horizontally or along a slight downward slope through the front section 110 of the lower frame portion 100. The drain channel 122 drains moisture that the lower frame portion 100 may accumulate from rain, morning dew, etc. running down the window and/or leaking through the gasket, or from within the window frame (not shown in FIG. 1). The fastener bore 124 is disposed opposite of the front portion 110. The fastener bore 124 may receive fasteners (e.g., bolts, screws, and/or the like) to secure a capping portion (not depicted) to the lower frame portion 100.

Figure 2A:
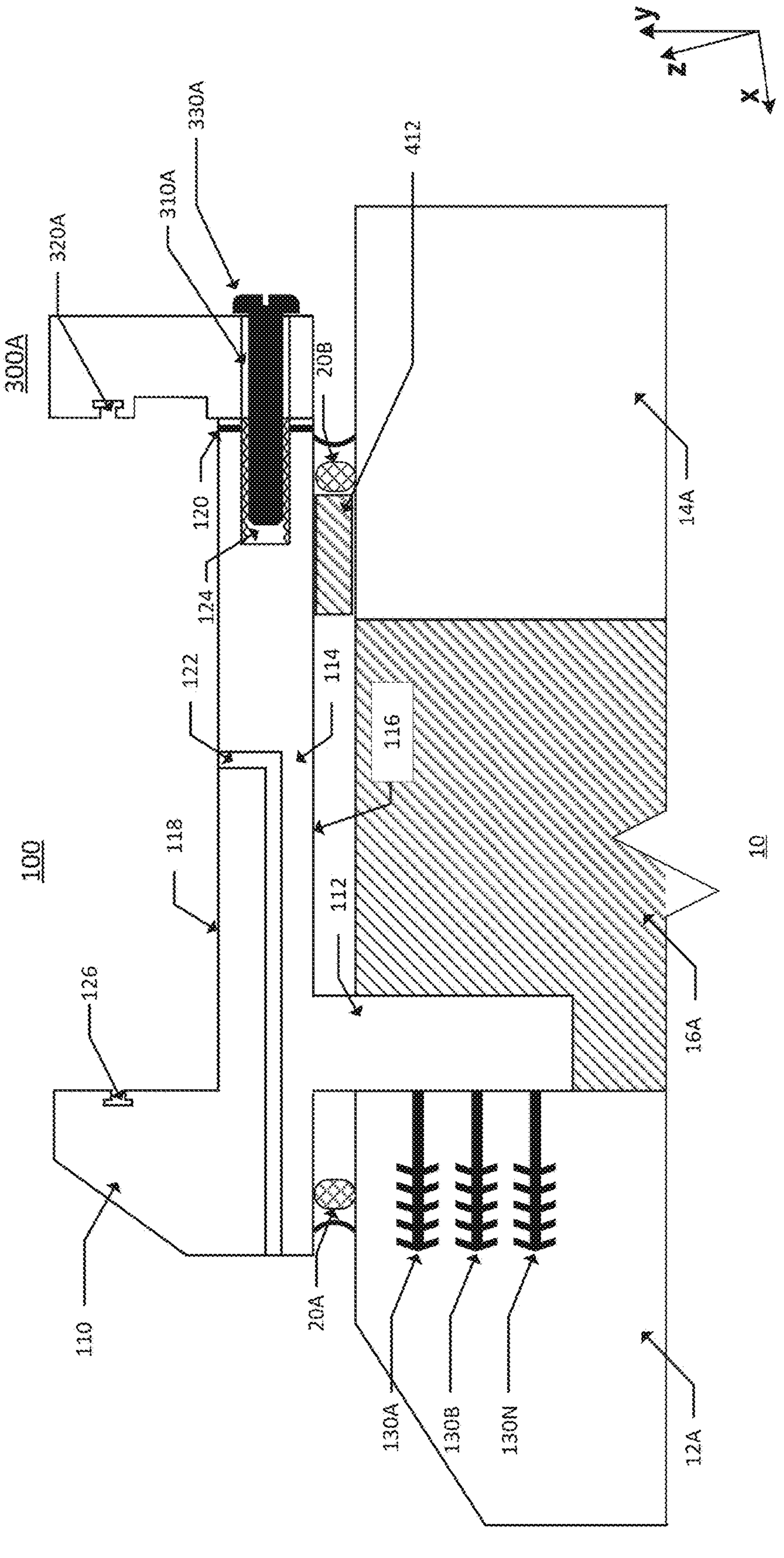
FIG. 2A illustrates a side cross-sectional view of an example lower frame assembly at a sill in accordance with various embodiments of the present disclosure.
Figure 2B:
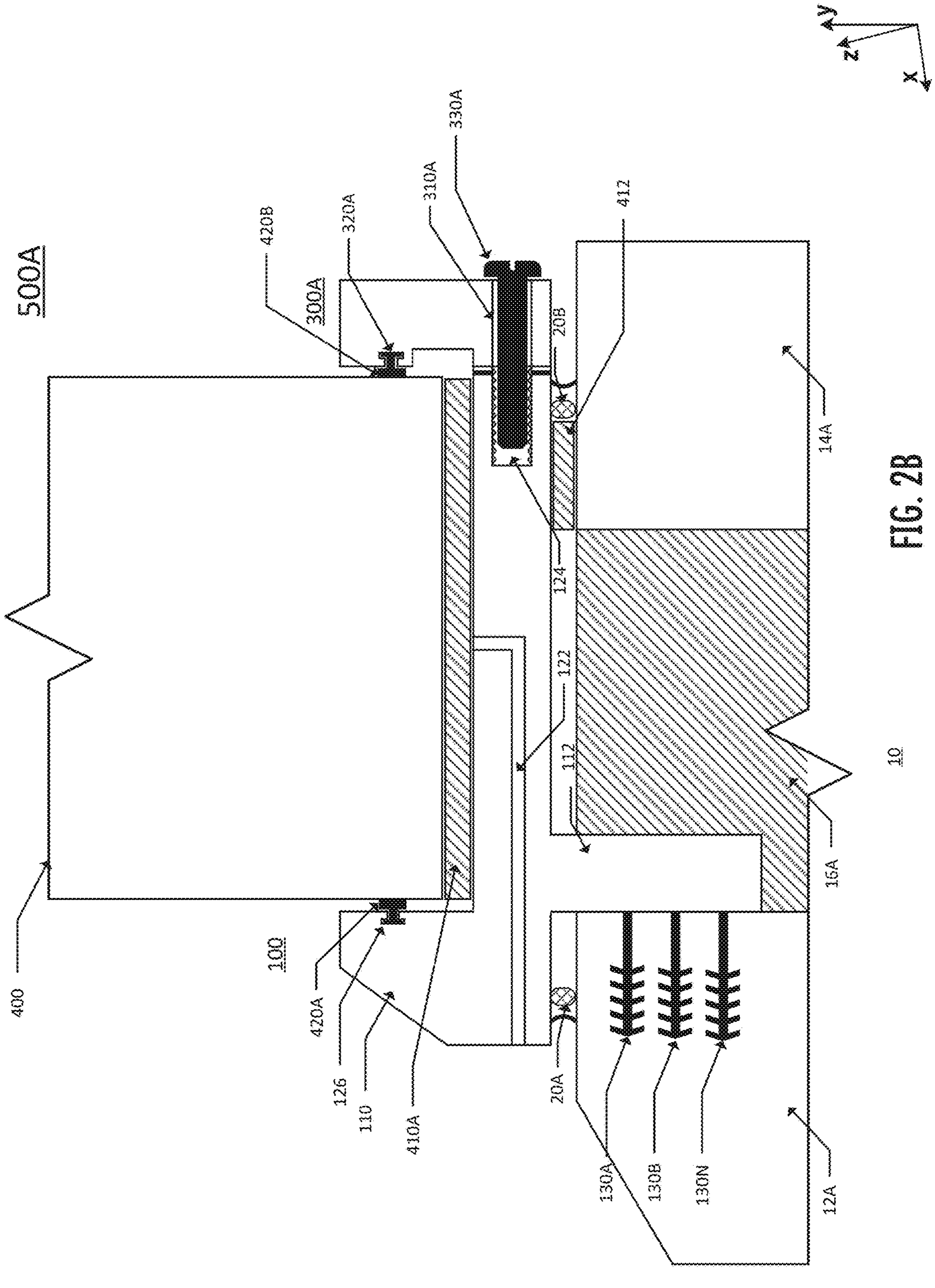
FIG. 2B illustrates a side cross-sectional view of an example object secured within the lower frame assembly at a sill in accordance with various embodiments of the present disclosure.

FIGS. 2A-2B depict exemplary side cross-sectional views of an example lower frame assembly secured to a wall in accordance with various embodiments of the present disclosure. In various embodiments, the lower frame assembly 500A may be a portion of a sill for a window, a door, and/or the like. The lower frame assembly 500A may comprise a lower frame portion 100 and a lower capping portion 300A. The lower capping portion 300A may detachably secure to the lower frame portion 100 with one or more fasteners 330A. The fasteners 330A are inserted into a fastener opening 310A of the lower capping portion 300A and secure the lower capping portion 300A to the lower frame portion 100 by affixing to a fastener bore 124 within the lower frame portion 100. The lower frame portion 100 may comprise one or more additional fastener bore(s) (not depicted) and/or the lower capping portion 300A may comprise one or more additional fastener opening (not depicted). The additional fastener bores may be spaced apart by a predetermined distance (e.g., 6 in. apart, 12 in. apart, 18 in. apart, or the like) along the length of the lower frame portion 100 (e.g., in the depicted embodiment, along the z-axis), and the additional fastener openings may be spaced apart by a predetermined distance (e.g., 6 in. apart, 12 in. apart, 18 in. apart, or the like) along the length of the lower capping portion 300A (e.g., in the depicted embodiment, along the z-axis). The predetermined distance for the additional fastener bores and/or additional fastener opening may be defined by the number of fasteners needed to appropriately meet the wind load, water, structural, and/or pressure requirements of the system according to building codes for the application. The installer may use a torque wrench, set to a predetermined amount of torque, to secure the fasteners of the capping portion to the fastener bores of the lower frame portion.

As noted, the lower frame portion 100 and/or the lower capping portion 300A may be constructed out of aluminum. The lower frame portion 100 and/or the lower capping portion 300A may be constructed from two or more aluminum sections or other suitable materials that may be preassembled before installation. The aluminum sections and/or other suitable materials may further comprise one or more thermal breaks 120 in order to prevent heat from conducting through the lower frame assembly. In some embodiments, the thermal break 120 may be in the form of a plastic bushing made of nylon, vinyl, and/or the like. The thermal break 120 is disposed opposite of the front section 110 of the lower frame portion and expands at least partially along the length of the lower frame portion 100 (and further around the entire frame portion to form a thermal break for the sill, head and jambs). In further embodiments, the aluminum sections and/or other suitable materials selected may further comprise a galvanic corrosion resistant layer to prevent galvanic corrosion between the lower frame assembly 500A and at least a portion of the wall.

With further reference to FIG. 2A, the lower frame portion 100 may be installed to at least a portion of a wall. An example wall 10 may comprise of a first wall portion 12A (e.g., exterior wall, exterior wythe, etc.), a second wall portion 14A (e.g., interior wall, interior wythe, etc.), and/or at least one additional wall portions 16A (e.g., insulation layer, etc.). In various embodiments, the first wall portion 12A and/or the second wall portion 14A may be constructed of concrete and steel or carbon fiber reinforcement, and/or the additional wall portions 16A may comprise an insulation material (e.g., spray foam, rigid foam board, rockwool, insulated panels, and the like). The first and second wall portions can be connected through the additional wall portion for shear strength by way of steel or carbon fiber connectors or by way of any other appropriately designed connectors. The wall 10 may be constructed in a manner, such that, the first wall portion 12A is first poured, the additional wall portions 16A are placed on top of and/or secured to the first wall portion 12A, and then the second wall portion 14A is poured on top of the additional wall portion 16A. Carbon fiber connector trusses may be installed additionally diagonally into the window opening to prevent cracking in high torsion areas.

With even further reference to FIG. 2A, in the depicted embodiment, the lower frame portion 100 may be positioned in a manner such that the securing section 112 engages, at least partially, with the wall 10 along the first wall portion 12A. The lower frame portion 100 may be installed simultaneously and/or separately with the additional wall portions 16A. In various embodiments, the lower frame portion 100 with one or more integrated connectors 130A, 130B, 130N (collectively "130") may be fitted within a mold of the wall for the first wall portion 12A before the concrete is poured. The concrete, once poured, is allowed to flow under the bottom surface 116 of the lower frame portion 100 and secure the integrated connector 130 in place upon drying. The concrete may need to be compacted through vibration to expel air pockets in order to create a seal between the first wall portion 12A and the integrated connectors 130. In some embodiments, the concrete of the second wall portion 14A may be poured in a manner, such that, the concrete abuts at least a portion of the bottom surface 116 of the lower frame portion. The concrete of the second wall portion 14A may assist in securing the lower frame portion 100 to the wall and/or assist with distributing the weight of the lower frame portion 100 and window 400 supported thereby.

In other embodiments, the lower frame portion 100 may be installed while the first wall portion 12A is still partially wet, and it can advantageously create a seal between the first wall portion 12A and the securing section a of the lower frame portion 100. A compression force is created between the lower frame portion 100 and the first wall portion 12A when an installer applies a force to the lower frame portion to secure the integrated connectors 130 within the first wall portion 12A. This action can compress liquid, which may comprise water and cement, from the still partially wet first wall portion 12A. The compressed liquid then dries and creates a bonding between the first wall portion 12A and the lower frame portion 100 to assist with securing and sealing the lower frame portion 100 in place. The installer can apply a force to the lower frame portion by pushing, hammering, and/or the like. The lower frame portion 100 may be secured to the first wall portion 12A before the concrete begins to "flash over" (e.g., roughly 15-30 minutes after being poured) so as provide for the sealing action between the lower frame portion 100 and the first wall portion 12A discussed above.

In various embodiments, the lower frame portion 100 may further comprise at least one frame portion shim 412. The frame portion shim 412 may be installed once the integrated connectors 130 of the securing portion 112 have at least partially secured with the first wall portion 12A. The frame portion shim 412 may be inserted within a gap created between the bottom surface 116 of the lower frame portion

100 and/or the second wall portion 14A (e.g., interior wall, interior wythe, etc.). The frame portion shim 412 may assist in securing the lower frame portion 100 in place with the second wall portion 14A. Further, the frame portion shim 412 may assist in transferring at least partially the load of the object (e.g., window, door, etc., not depicted) to a portion of the second wall portion 14A. The frame portion shim 412 can be used to ensure that the lower frame portion 100 is leveled to receive the window. The frame portion shim 412 may comprise a rigid material (e.g., wood, polypropylene (PP), high-impact polystyrene (HIPs), acrylonitrile butadiene styrene (ABS), and/or the like) to withstand the weight of the lower frame portion 100 and/or the window.

The lower frame portion 100 may be further secured to a wall with one or more seals 20A, 20B (collectively "20"). The seals 20 may comprise of an elastomer material (e.g., ethylene propylene diene (EPDM), silicone, thermoplastic elastomers (TPE), vulcanized thermoplastic elastomers (TPV), natural rubbers, fluorocarbon, fluorosilicate (FSI), polyurethane (PU), and/or the like). The elastomer material of the seals 20 allows for the seals 20 to have a high flexibility configured to withstand settling of the wall 10, joint movement, foundational movement, thermal expansion/contraction etc., without cracking and/or crumbling and/or without losing adhesion for sealing. The seals 20 reduce the amount of cold and/or heat from entering the first wall portion 12A (e.g., exterior wall) and moving to the second wall portion 14A (e.g., interior wall) and further prevent moisture from entering the additional wall portions 16A. In the depicted embodiments, the lower frame portion 100 may be further connected to the wall with a first seal 20A and a second seal 20B, wherein both the first seal 20A and the second seal 20B secure to the bottom surface 116 of the lower frame portion. Caulking may be applied around the exterior surface of each seal to further prevent moisture intrusion.

FIG. 2B depicts an exemplary side cross-sectional view of an example window secured within a lower frame assembly in accordance with various embodiments of the present disclosure. In various embodiments, a window 400 is secured within a lower frame assembly 500A with the assistance of the front section 110 of the lower frame portion and/or the lower capping portion 300A. The distance defined between the front section 110 of the lower frame portion and the lower capping portion may be equal to the standard width of a window. For example, the window depicted in FIG. 2B comprises a standard depth of 4½".

With further reference to FIG. 2B, the window 400 may be further secured within the lower frame assembly with at least one shim 410A. The shim 410A may be inserted within a gap created between the window 400 and/or the upper surface of the lower frame portion. The shim 410A may assist in securing the window in place with the lower frame portion and/or with the lower capping portion 300A. The 410A may be placed on top of the top surface of the lower frame portion before the window 400 is inserted within the lower frame portion. The shim 410A is used to ensure that the window 400 inserted within the lower frame portion is leveled. The shim 410A may comprise a rigid material (e.g., wood, polypropylene (PP), high-impact polystyrene (HIPs), acrylonitrile butadiene styrene (ABS), and/or the like) to withstand the weight on the window 400.

With even further reference to FIG. 2B, in various embodiments, the window 400 may comprise at least one gasket 420A, 420B (collectively "420") configured to secure within one or more channels (e.g., front section channel 126 and/or capping portion channel 320A). In the depicted embodiment, the window comprises a first gasket 420A on a first side of the window and/or a second gasket 420B on a second side of the window. The first gasket 420A secures to the lower frame portion by being inserted into the channel 126 defined by the front section 110. The second gasket 420B secures to the lower capping portion 300A by being inserted into the channel 320A defined by a body of the lower capping portion 300A. The first gasket 420A and/or the second gasket 420B may be inserted into the respective channels before the window 400 is installed within the lower frame assembly 500A. The first gasket 420A and/or the second gasket 420B may be composed of an elastomer material (e.g., ethylene propylene diene monomer (EPDM) rubber, thermoplastic elastomers (TPEs), silicone rubber, and/or the like). The first gasket 420A and/or the second gasket 420B, while secured in their corresponding channels 126, 320A, create barriers for the lower frame portion and/or the lower capping portion 300A. The barriers created by the first gasket 420A and/or the second gasket 420B act to prevent drafts of air or water from entering the lower frame portion.

Figure 3:
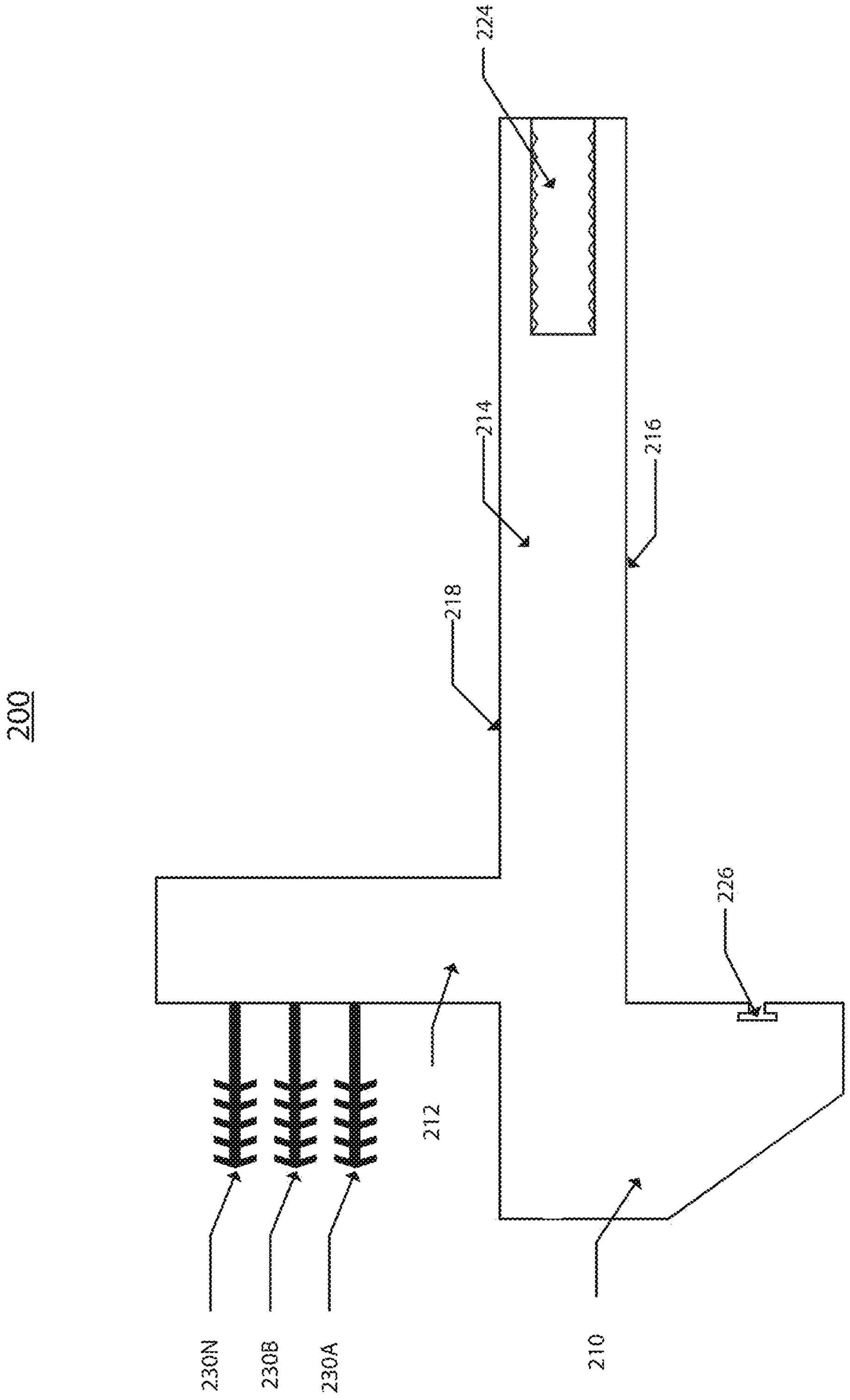
FIG. 3 illustrates a side cross-sectional view of an example upper frame portion at a head in accordance with various embodiments of the present disclosure.

FIG. 3 depicts a side cross-sectional view of an example upper frame portion 200 (e.g., the head), which in the depicted embodiments is similarly constructed to the lower frame portion and includes a front section 210, a securing section 212, and/or a body section 214. The upper frame portion comprises at least one integrated connector 230A, 230B, 230N (collectively "230"), at least one fastener bore 224, and/or a channel 226 configured to receive at least one gasket. The upper frame portion 200 may be configured without a drain channel.

Figure 4A:
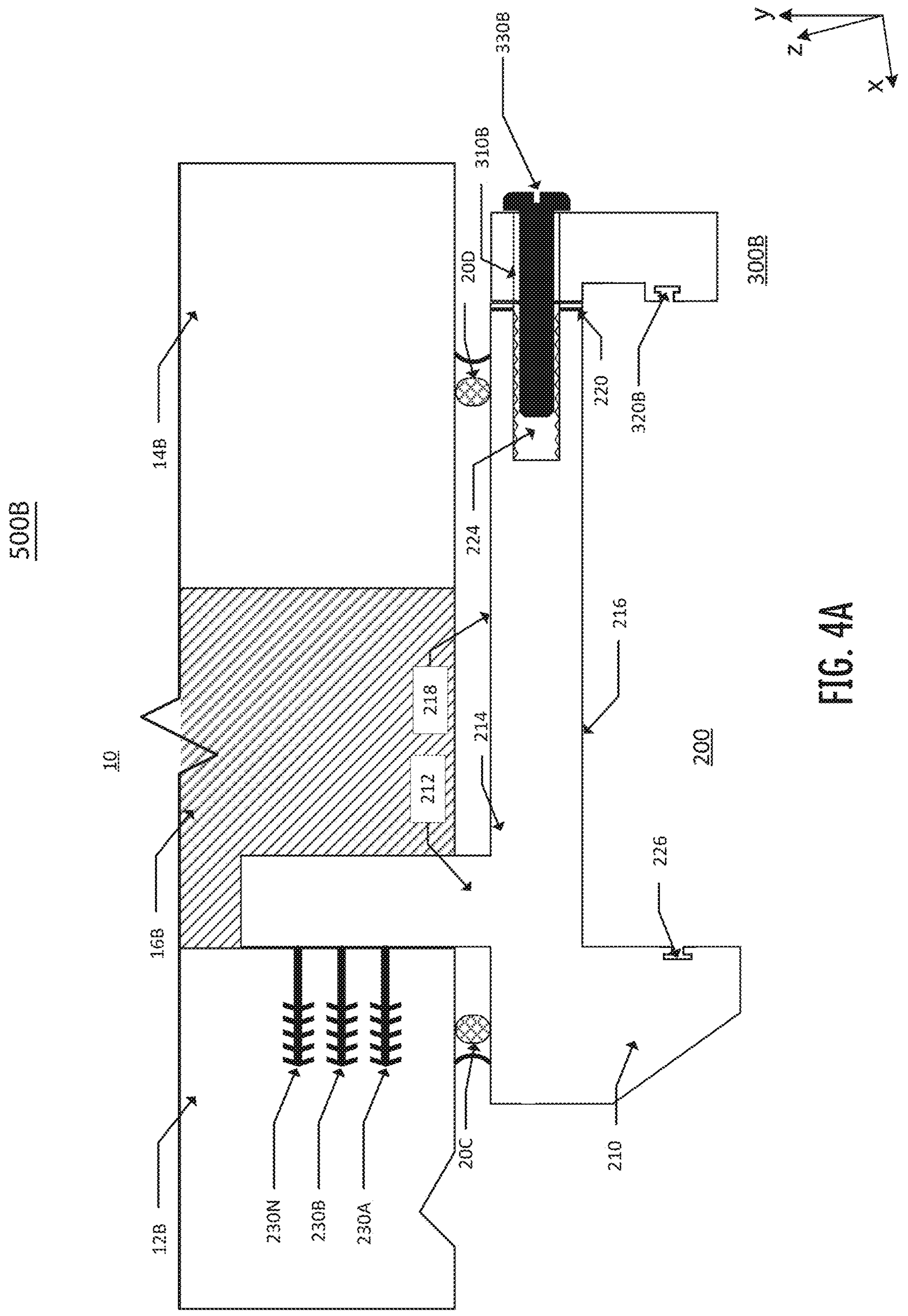
FIG. 4A illustrates a side cross-sectional view of an example upper frame assembly at a head in accordance with various embodiments of the present disclosure.
Figure 4B:
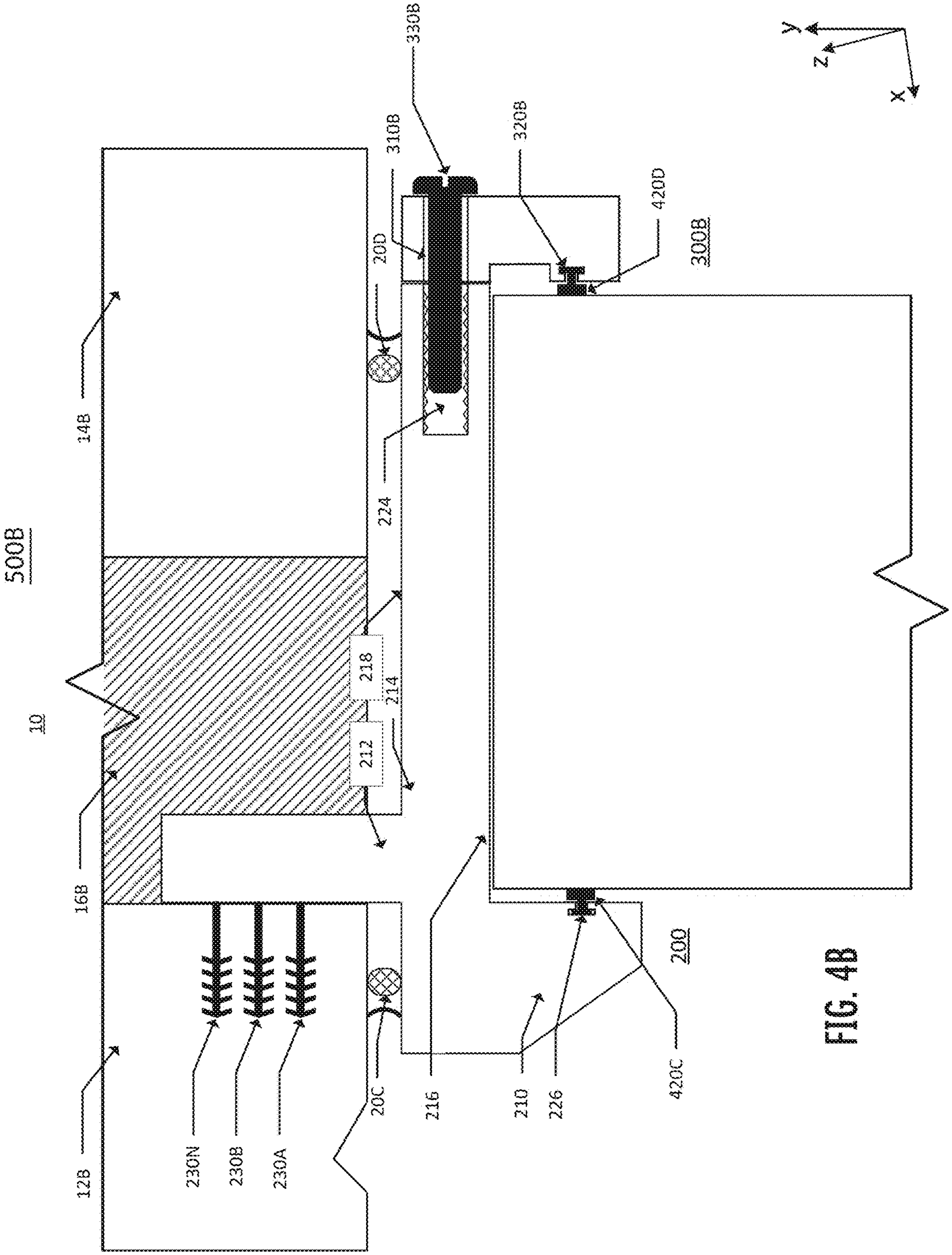
FIG. 4B illustrates a side cross-sectional view of an example object secured within the upper frame assembly at a head in accordance with various embodiments of the present disclosure.

FIGS. 4A-4B depict exemplary side cross-sectional views of an example upper frame assembly secured to a wall in accordance with various embodiments of the present disclosure. In various embodiments, the upper frame assembly 500B corresponds to a head for a window, a door, and/or the like. The upper frame assembly 500B may comprise an upper frame portion 200 and/or an upper capping portion 300B. The upper capping portion 300B may detachably secure to the upper frame portion 200 via a fastener 330B. The fastener 330B is inserted into a fastener opening 310B of the upper capping portion 300B and secures the upper capping portion 300B to the upper frame portion 200. In various embodiments, the upper frame portion 200 may comprise additional fastener bore(s) (not depicted) and/or the upper capping portion 300B may comprise additional fastener opening (not depicted) like the lower frame assembly. In various embodiments, the upper frame portion 200 and/or the upper capping portion 300B may be constructed out of an aluminum material. The upper frame portion 200 and/or the upper capping portion may comprise the same features as the lower frame portion and/or the lower capping portion.

With further reference to FIG. 4A, in various embodiments, the upper frame portion 200 may be installed to at least an upper portion of a wall. The upper frame portion 200 is positioned in the same manner as the lower frame portion, such that, a securing section 212 engages, at least partially, with the wall 10 along the first upper wall portion 12B and/or the at least one additional upper wall portion 16B. The upper frame portion 200 may be installed simultaneously and/or separately with the one or more additional wall portions 16B. In various embodiments, the upper frame portion 200 may be installed fitted within a mold for the wall along the first wall portion 12B before the concrete is poured. The concrete, once poured, is allowed to flow under the bottom surface 218 of the upper frame portion 200 and secure the integrated connectors 230 in place upon drying. The concrete may need to be compacted through vibration to expel air pockets in order to create a seal between the first wall portion 12B and the integrated connectors 230.

In other embodiments, the upper frame portion may be installed at the same time as the lower frame portion, while the concrete is still at least partially wet, to create a seal between the first upper wall portion 12B and at least a portion of the securing section 212 of the upper frame portion 200. The upper frame portion 200 is secured to a first wall portion 12B, via at least one integrated connector 230. The integrated connectors 230 of the upper frame portion 200 may be configured to be similar to the integrated connectors of the lower frame portion.

With further reference to FIG. 4A, in various embodiments, an upper frame portion 200 may be further secured to a wall with one or more seals 20C, 20D (collectively "20"). The seals 20 may comprise of an elastomer material. The elastomer material of the seals 20 comprise the same material and/or functions as the seals of the lower frame portion. A rain drip may be formed as a recess in the upper wall portion 12B to prevent rainwater from running along the lower edge thereof and towards the seal 20C.

In various embodiments, a window 400 is secured within an upper frame assembly 500B with the assistance of the front section 210 of the upper frame portion and/or the upper capping portion 300B. In various embodiments, the slot created from the front section 210 of the upper frame portion and the upper capping portion 300B may be equal to the standard size of the window. The upper capping portion 300B secures to the upper frame portion 200 in the same manner as the lower capping portion secures to the lower frame portion.

With further reference to FIG. 4B, the assembly further comprises at least one gasket 420C, 420D (collectively "420") configured to secure within channels of the upper frame assembly 500B. In the depicted embodiment, the window 400 comprises a third gasket 420C on a first side of the window 400 and/or a fourth gasket 420D on a second side of the window 400. The third gasket 420C may secure to the upper frame portion 200 by being inserted into the channel 226 defined by the front section 210. The fourth gasket 420D may secure to the upper capping portion 300B by being inserted into the channel 320B defined by the body of the upper capping portion 300B. In various embodiments, the third gasket 420C and/or the fourth gasket 420D may be comprised of an elastomer material.

Figure 5:
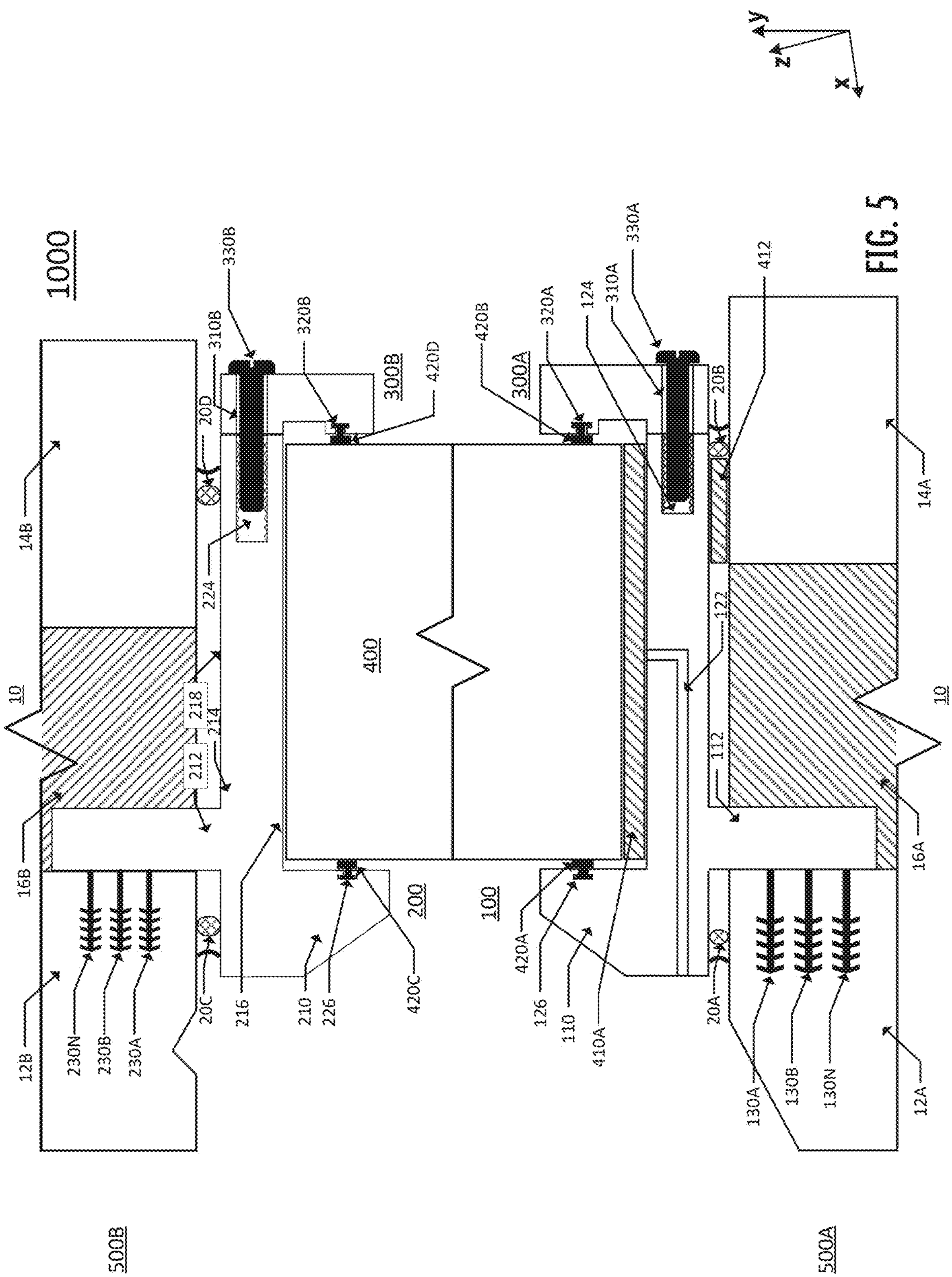
FIG. 5 illustrates a side cross-sectional view of an example object secured within the framing system in accordance with various embodiments of the present disclosure.

FIG. 5 depicts an exemplary side cross-sectional view of an example framing system in accordance with various embodiments of the present disclosure. In various embodiments, a framing system 1000 comprises a lower frame assembly 500A, an upper frame assembly 500B, and/or a wall. The frontmost edge of the front section 110 of the lower frame portion 100 is aligned with the frontmost edge of the front section 210 of the upper frame portion 200. The framing system 1000 may further comprise a pair side frame assemblies (e.g., jambs, not depicted). The side frame assemblies may each comprise a side frame portion and a side capping portion that is constructed and/or functions similarly to the lower frame assembly and/or the upper frame assembly. The side frame portion connects the lower frame portion to the upper frame portion to complete the frame (e.g., square, rectangle, etc.).

With further reference to FIG. 5, in various embodiments, a window 400 may be secured within a framing system 1000 by being installed into a lower frame assembly 500A, an upper frame assembly 500B, and/or a side frame assembly (not depicted) either one edge at a time or simultaneously. Thereafter, the lower capping portion 300A, the upper capping portion 300B, and/or a side capping portion (not depicted) may be installed to the corresponding frame portions to secure an object therein.

In various embodiments, the lower frame assembly, the upper frame assembly, and the side frame assemblies may be constructed out of extruded aluminum sections. In this instance, the sections may be secured to each other at their corners to define a perimeter frame. The sections can be secured in any number of manners such as by way of fasteners, brackets, adhesives, etc. In other embodiments, the framing system may be constructed from a moldable material, such as a thermoplastic, wherein the lower frame assembly, the upper frame assembly, and the side frame assembly can be molded as a unitary structure.

With further reference to FIG. 5, the lower capping portion 300A and/or an upper capping portion 300B may be secured to the corresponding frame portion to secure the window 400. In various embodiments, the at least one side capping portion(s) (not depicted) may be secured simultaneously with the lower frame capping portion and/or the upper frame capping portion. A first fastener 330A is inserted into the fastener opening 310A defined by the lower capping portion 300A. The first fastener 330A extends entirely through the lower capping portion 300A and secures to the fastener bore 124 within the body section 114 of the lower frame portion. A second fastener 330B is inserted into the fastener opening 310B defined by the upper capping portion 300B. The second fastener 330B extends entirely through the upper capping portion 300B and secures to the fastener bore 224 within the body section 214 of the upper frame portion.

In some embodiments, the window 400 may be snapped into place, wherein at least one snap secures the window to the lower frame assembly, the upper frame assembly and the side frame assemblies.

Further, although described herein with reference to inserting objects such as windows or doors into an opening in a wall, embodiments of the invention may be used to secure structures to an edge portion of a wall, such as a bulkhead for supporting piece of mechanical equipment. Similarly, a frame assembly may be replaced by a bracket for securing the wall to another structure, such as a conventional curtain wall, which can help in erection of a building.

Figure 6:
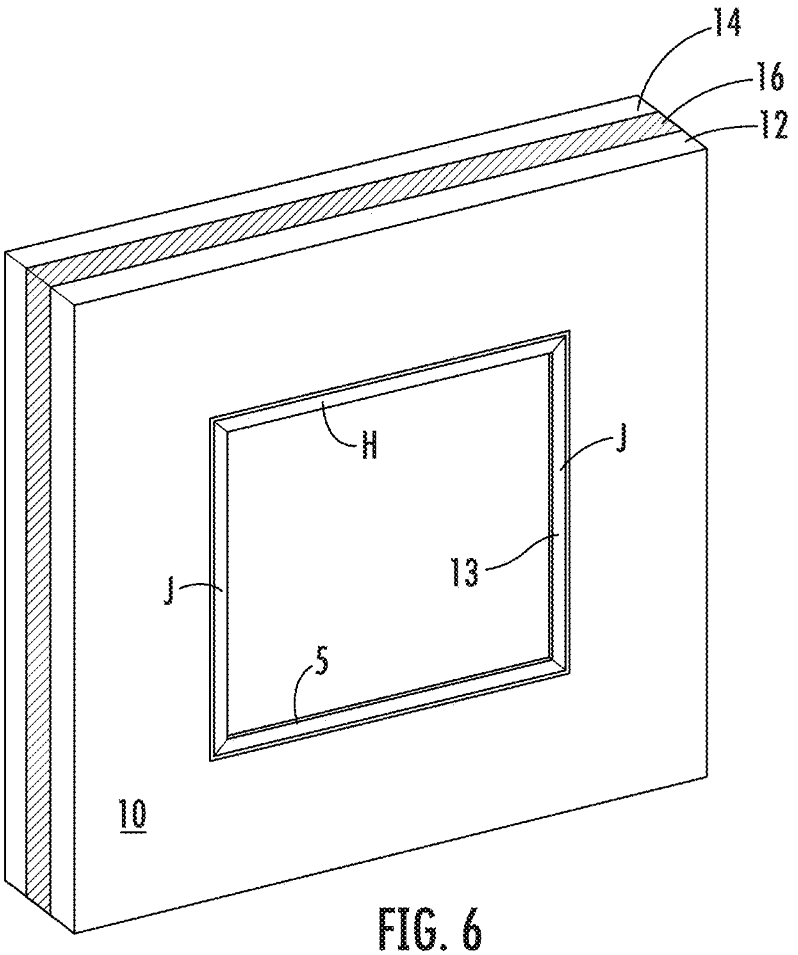
FIG. 6 illustrates a perspective view of a precast sandwich wall showing an opening therein for a window.

FIG. 6 shows a perspective view of a precast sandwich wall 10 having two wythes comprising the first wall portion 12, the second wall portion 14 and the additional wall portion in the form of insulation material 16 therebetween. The precast sandwich wall has an opening 13 therein for receiving a fenestration object, which can include windows, door, skylights and the like. The opening defines the positions for the head H, the sill S, and the jambs J. This precast sandwich wall can be cast in a factory environment and then, in the same factory environment, the frame assembly can be installed in the opening along with the seals, gaskets and/or caulking. Thus, in some embodiments, when the entire precast sandwich wall (including the factory-installed and sealed frame assembly) is shipped to a job site, the only tasks remaining could be to place and secure the fenestration object within the frame assembly. Embodiments of the invention thus provide that a precast sandwich wall can be constructed at a factory with a sealed window frame assembly therein, but without installing the windows at the factory, which might be easily broken during the wall construction or later shipping to the job site. According to embodiments, the precast sandwich wall can be of the tilt-up type, and so the windows may be fitted at the jobsite before the wall is tilted up from horizontal to vertical, or after.

Figure 7:
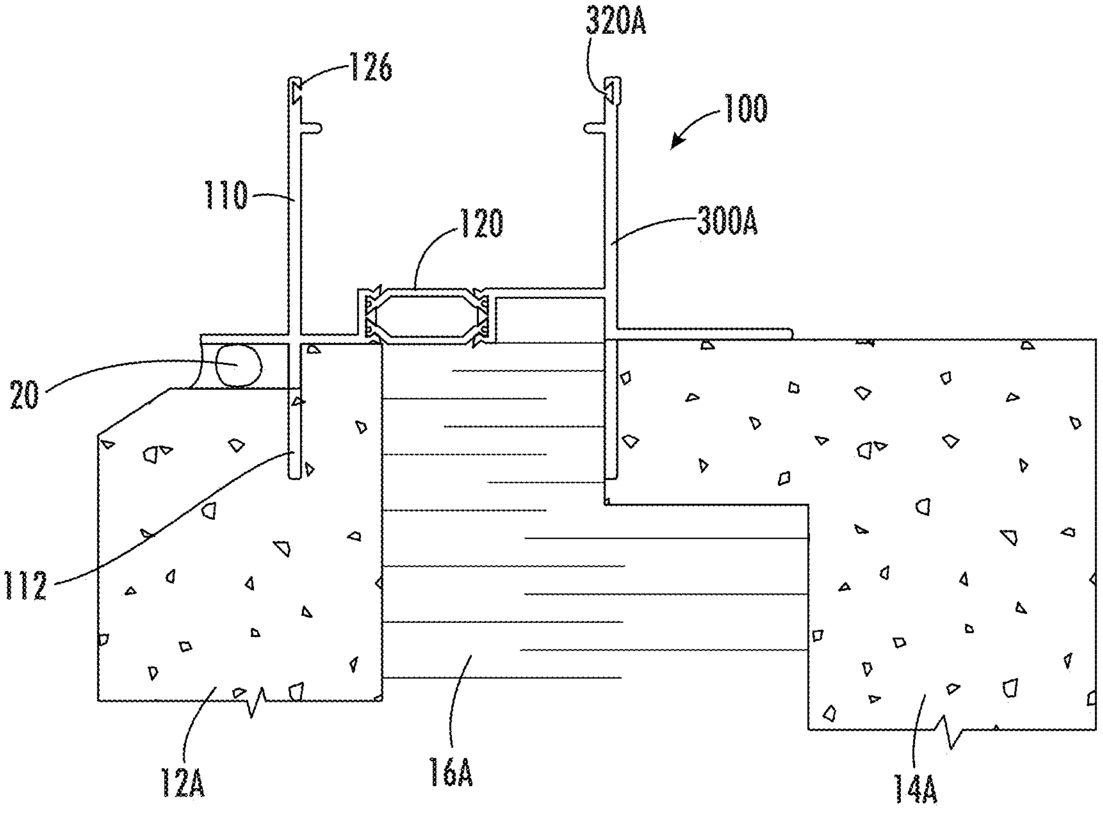
FIG. 7 illustrates a side cross-sectional view of a frame assembly embodiment secured to a sill of a precast sandwich wall opening.

FIG. 7 illustrates a side cross-sectional view of a frame assembly embodiment secured to a sill of a precast sandwich wall opening. In this embodiment, the securing section 112 is cast within the concrete of the first wall portion 12A without an integrated connector extending orthogonally thereto. A front section 110 is on the outside and the engages the front of a fenestration object such as a window, and a lower capping portion 300A is on the inside and engages the back thereof. A thermal break 120 is provided between and connects the front section 110 with the lower capping portion 300A. This thermal break can be made of a material with low heat conductivity, such as a thermoplastic, and advantageously is positioned in contact with the insulation material of the additional wall portion 16A. In this manner, there are no heat conduction pathways between the outside and the inside, thus improving the insulation capability. For example, if the framing assembly is formed from aluminum, there is no pathway through the relatively heat conductive concrete and/or aluminum materials between the outside and the inside.

Figure 8:
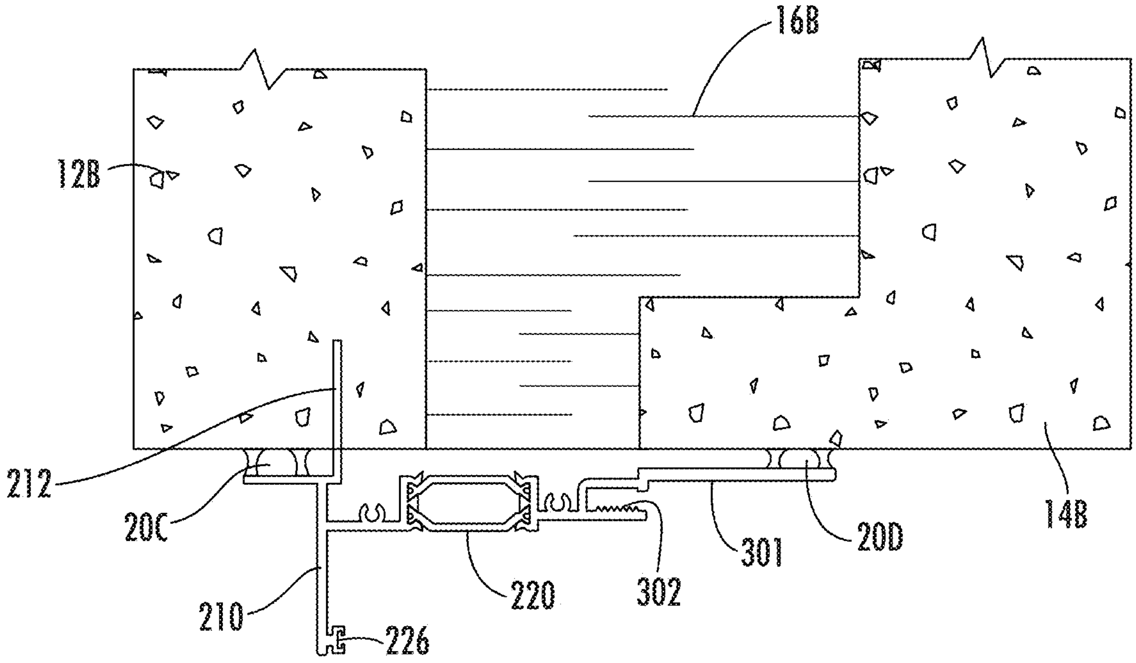
FIG. 8 illustrates a side cross-sectional view of a frame assembly embodiment secured to a head of a precast sandwich wall opening.
Figure 9:
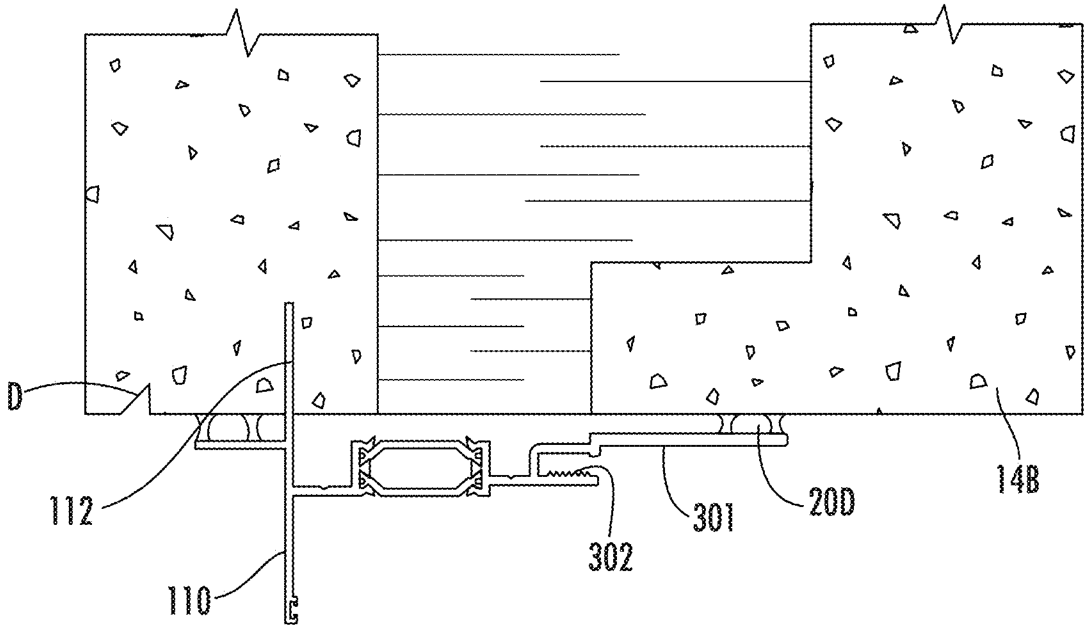
FIG. 9 illustrates a side cross-sectional view of a frame assembly embodiment secured to a jamb of a precast sandwich wall opening.

FIGS. 8 and 9 are side cross-sectional views of a frame assembly embodiment secured to the head and jambs respectively of a precast sandwich wall opening. For the head and the jambs, the frame assembly further comprises a capping portion support 301 which is sealed to the second wall portion 14B with seals 20D. The capping portion support 301 defines a receiver 302 in the form of a channel for receiving the capping portion (not shown). The receiver 302 may be formed with teeth on one or more sides of the channel for securely receiving the capping portion in a one-way snap-fit connection. The capping portion may similarly be fitted with corresponding teeth such that the capping portion is securely locked in place once fitted. This arrangement reduces or eliminates the need for further fasteners such as bolts or screws to be provided for securing the fenestration object in the framing assembly and thus no tools may be needed at the jobsite to install the windows.

FIGS. 8 and 9 also show that the thermal break 220 does not need to be abutted against the insulation material but could be separated therefrom. Nonetheless, the alignment of the thermal break with the insulation material prevents unwanted heat conduction and improves the insulation performance of the frame assembly. FIG. 9 shows a rain drip D in the form of a recess or chamfer to prevent rainwater from running along the lower surface of the wall and towards the seal. A piece of flashing (not shown) may alternatively or additional be provided at that location to further ensure rain drips from the head and not down onto the seals or window.

Figure 10:
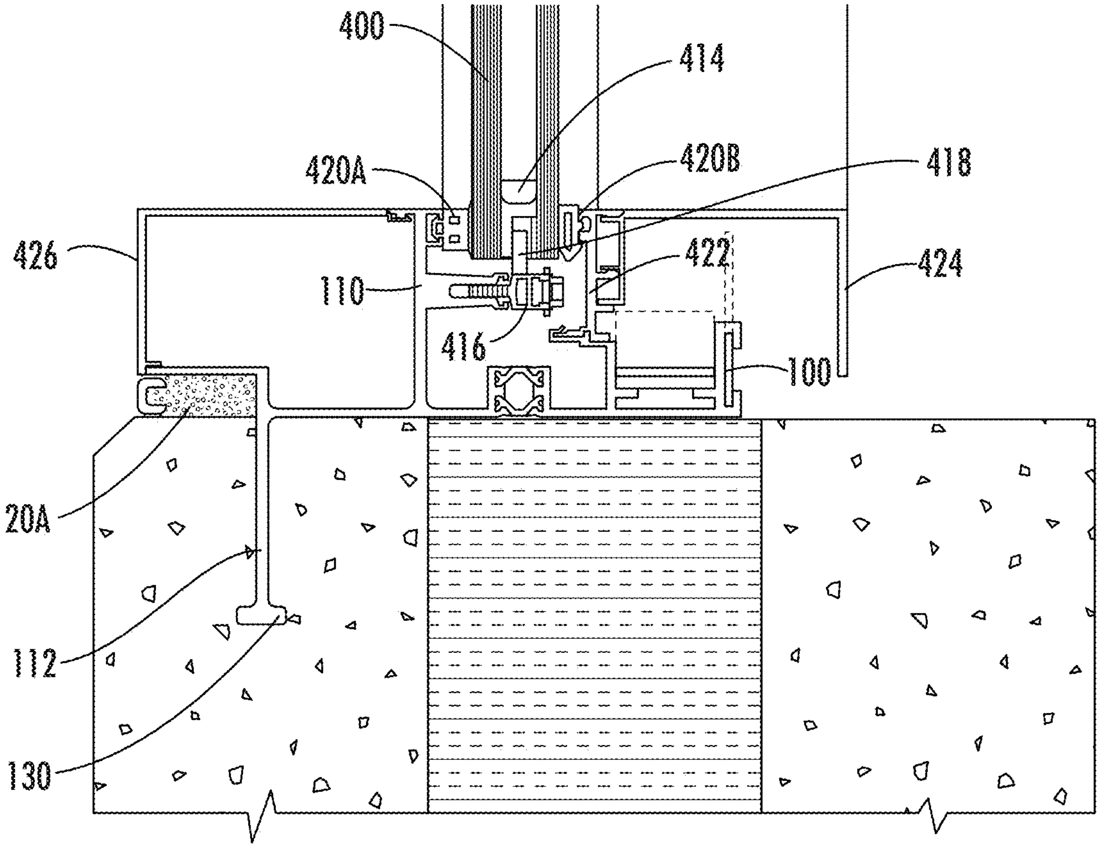
FIG. 10 illustrates a side cross-sectional view of a frame assembly embodiment secured to a sill of a precast sandwich wall opening configured for interior glazing.
Figure 11:
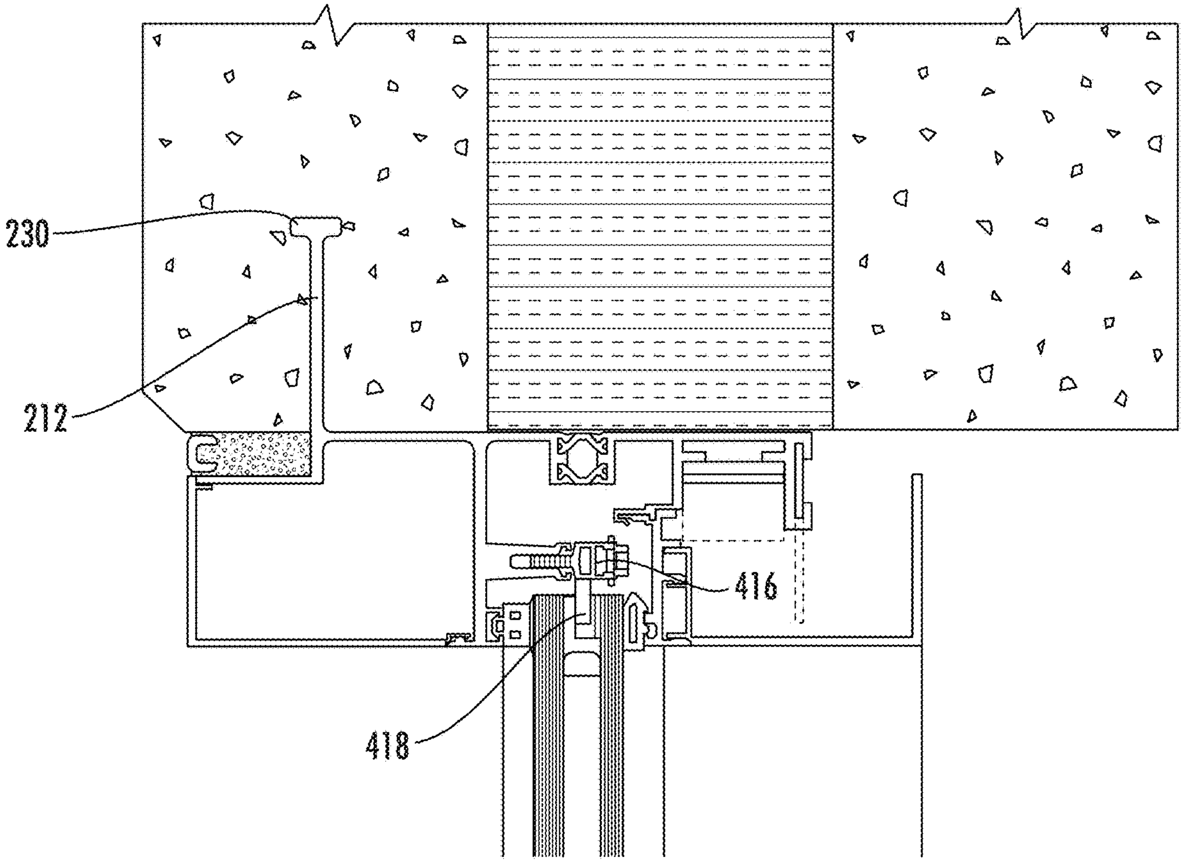
FIG. 11 illustrates a side cross-sectional view of a frame assembly embodiment secured to a head of a precast sandwich wall opening configured for interior glazing.
Figure 12:
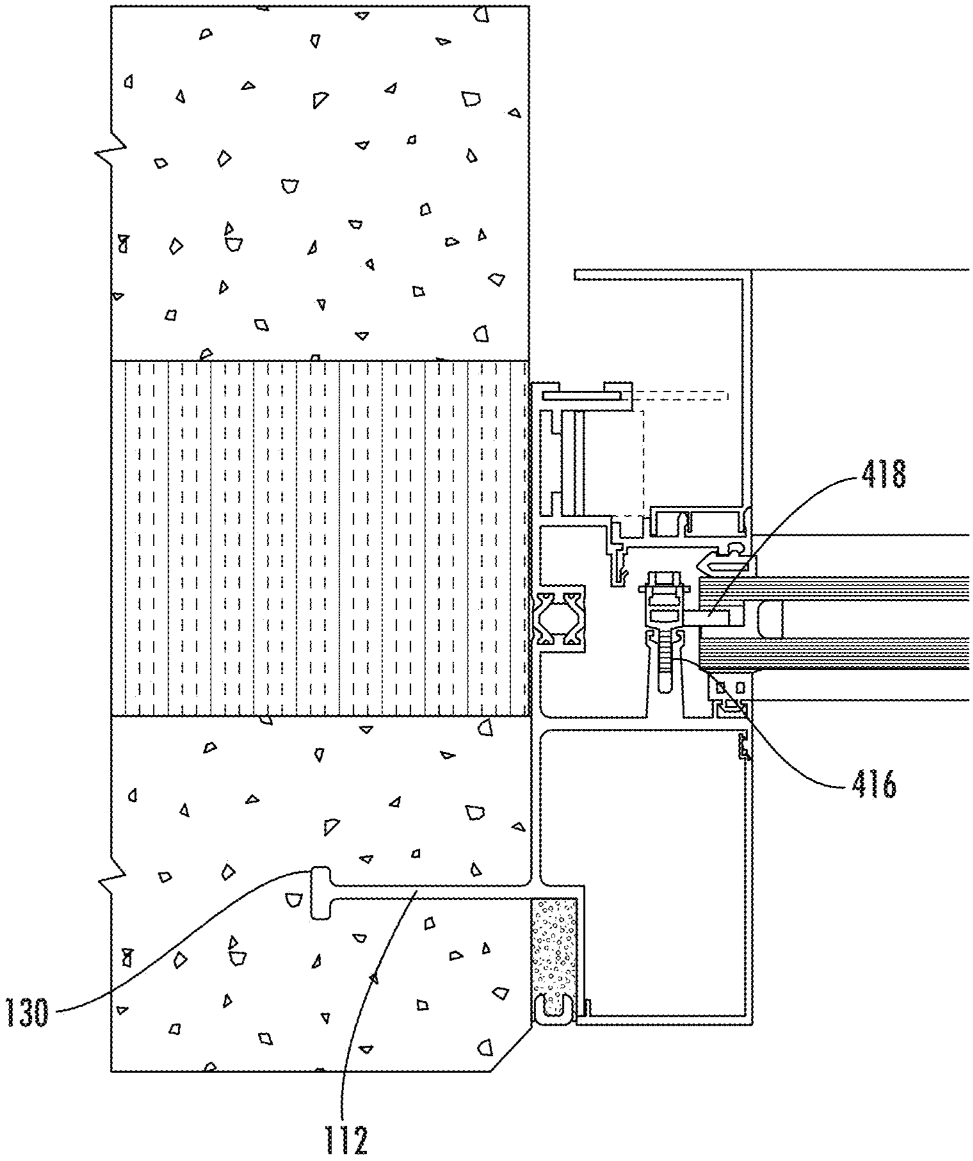
FIG. 12 illustrates a side cross-sectional view of a frame assembly embodiment secured to a jamb of a precast sandwich wall opening configured for interior glazing.

FIGS. 10-12 illustrate side cross-sectional views of a frame assembly embodiment secured to the sill, head and jambs, respectively. of a precast sandwich wall opening configured for interior glazing. Here, the securing sections 112, 212 have a smoother profile and the integrated connectors 130, 230 resemble an I-beam profile. In some embodiments, the surfaces of the securing sections and/or integrated connectors could be provided with a surface texture to better engage and secure within the concrete. Additionally or alternatively, the securing section and/or integrated connectors may be provided with openings along their length to better engage and secure with the concrete and also help eliminate voids due to air bubbles in the wet concrete. For example, after forming the securing section from a continuous aluminum extrusion, holes may be drilled along its length to allow the wet concrete to enter the holes and better anchor to the securing section to the wall after the concrete is dry. Two seals can be provided, and according to some embodiments the outer seal can be the Seismic Colorseal® product from Emseal®. This is a silicone-coated, pre-compressed primary seal with various colors available for architectural aesthetics. A trim piece 426 may be provided and snapped into the lower frame portion 110.

The fenestration object illustrated in FIGS. 10-12 is a window 400 in the form of an insulated glass unit (IGU). The insulated glass unit is formed with two panes of glass separated by a spacer 414 with the spacer positioned inboard of the outer edges of the panes of glass. This spacer provides a recess configured to provide engagement of one or more glass toggle bolts 416. The glass toggle bolts 416 comprise a bolt and a tab 418 supported thereby and that is positioned to extend into the recess. The bolts are configured to be screwed into corresponding bolt holes defined in the lower frame portion 110. As the bolts are tightened into the bolt holes, the tabs 418 advance with the bolts (to the left in FIGS. 10-12) and engage the outer pane of glass of the insulated glass unit. The bolts are continually tightened until the insulated glass unit is sufficiently secured to the frame portions. As with the capping portions described above, each tab 418 is configured to act as a restraining member for engaging with a portion of the object opposite the frame portion and thereby securely hold the object in place.

Then, two snap on trim pieces 422, 424 can be secured by hand onto the inside of the lower frame portion to conceal the glass toggle bolt 416 from viewers inside the building. Gasket 420A is fitted before the glass toggle bolt 416 is tightened and gasket 420B is fitted with the snap on trim piece 422.

In this embodiment, the window can be glazed from the interior of the building. For tall buildings, this can be advantageous as the glazer or installer does not need to be outside of the building during installation. This is a benefit both during initial installation during construction of the building, but also later in the building's life if the window needs to be replaced due to breakage, renovation or the like.

Figure 13:
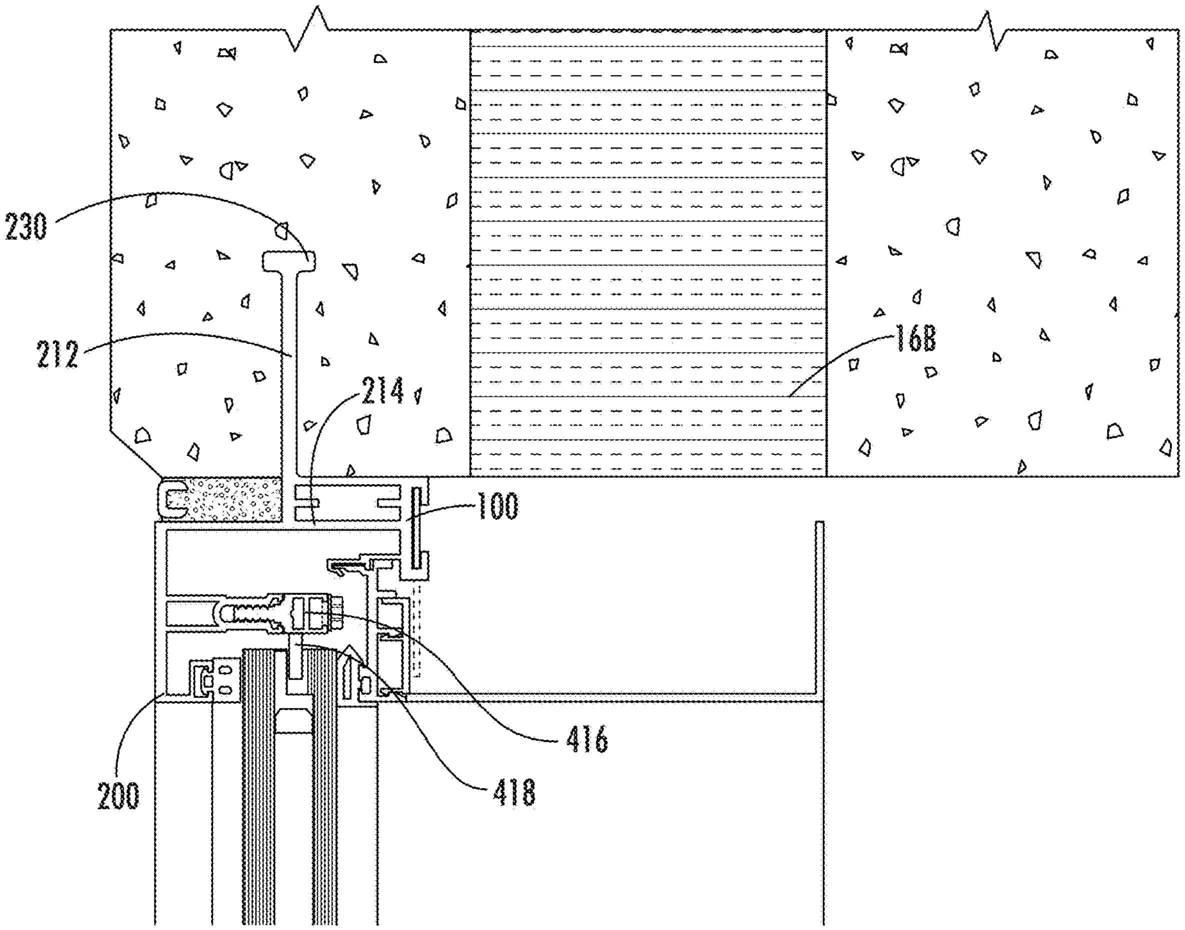
FIG. 13 illustrates a side cross-sectional view of a frame assembly embodiment secured to a head of a precast sandwich wall opening configured for interior glazing.

FIG. 13 illustrates a side cross-sectional view of a frame assembly embodiment secured to a head of a precast sandwich wall opening configured for interior glazing. This embodiment is similar to the one illustrated in FIG. 11. However, the body section 214 of the upper frame portion 200 does not extend inwardly to at least partially cover or align with the insulation material 16B. Although not illustrated, the head and jambs may have the same configuration.

Figure 14:
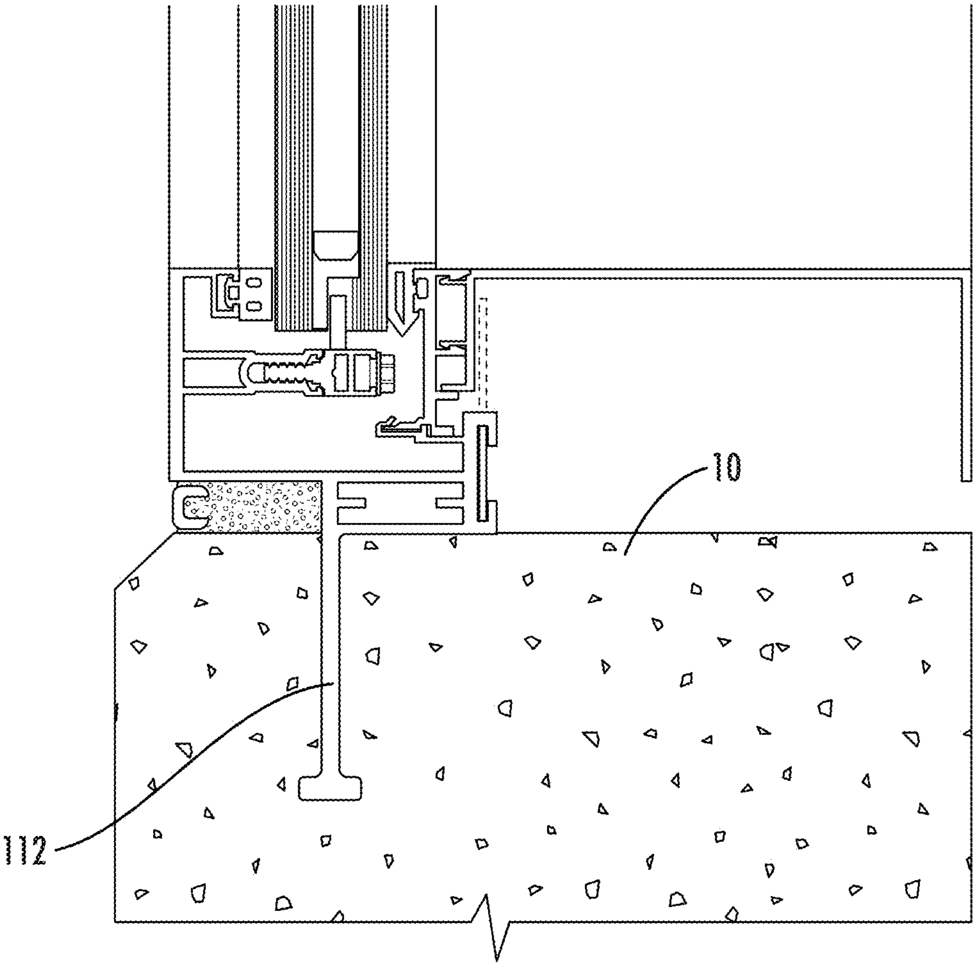
FIG. 14 illustrates a side cross-sectional view of a frame assembly embodiment secured to a sill of a solid wall opening configured for interior glazing.

FIG. 14 illustrates a side cross-sectional view of a frame assembly embodiment secured to a sill of a precast solid wall opening configured for interior glazing. This embodiment is similar to that illustrated in FIG. 10. However, the wall 10 is cast from a single portion of solid concrete with no insulation material therein. Insulation may be later added to the inside of the solid concrete wall. Although not illustrated, the head and jambs may have the same configuration.

Figure 15:
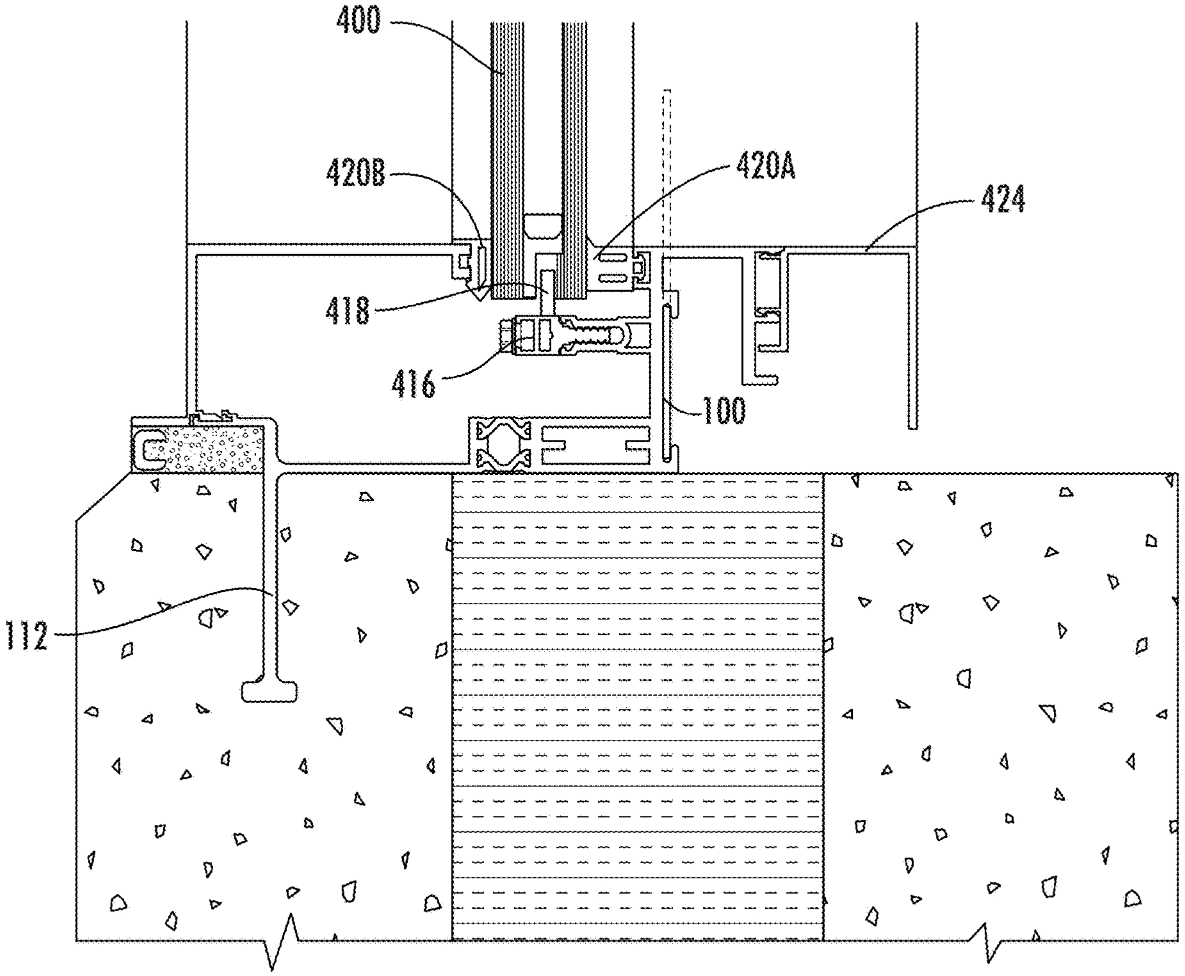
FIG. 15 illustrates a side cross-sectional view of a frame assembly embodiment secured to a sill of a sandwich wall opening configured for exterior glazing.
Figure 16:
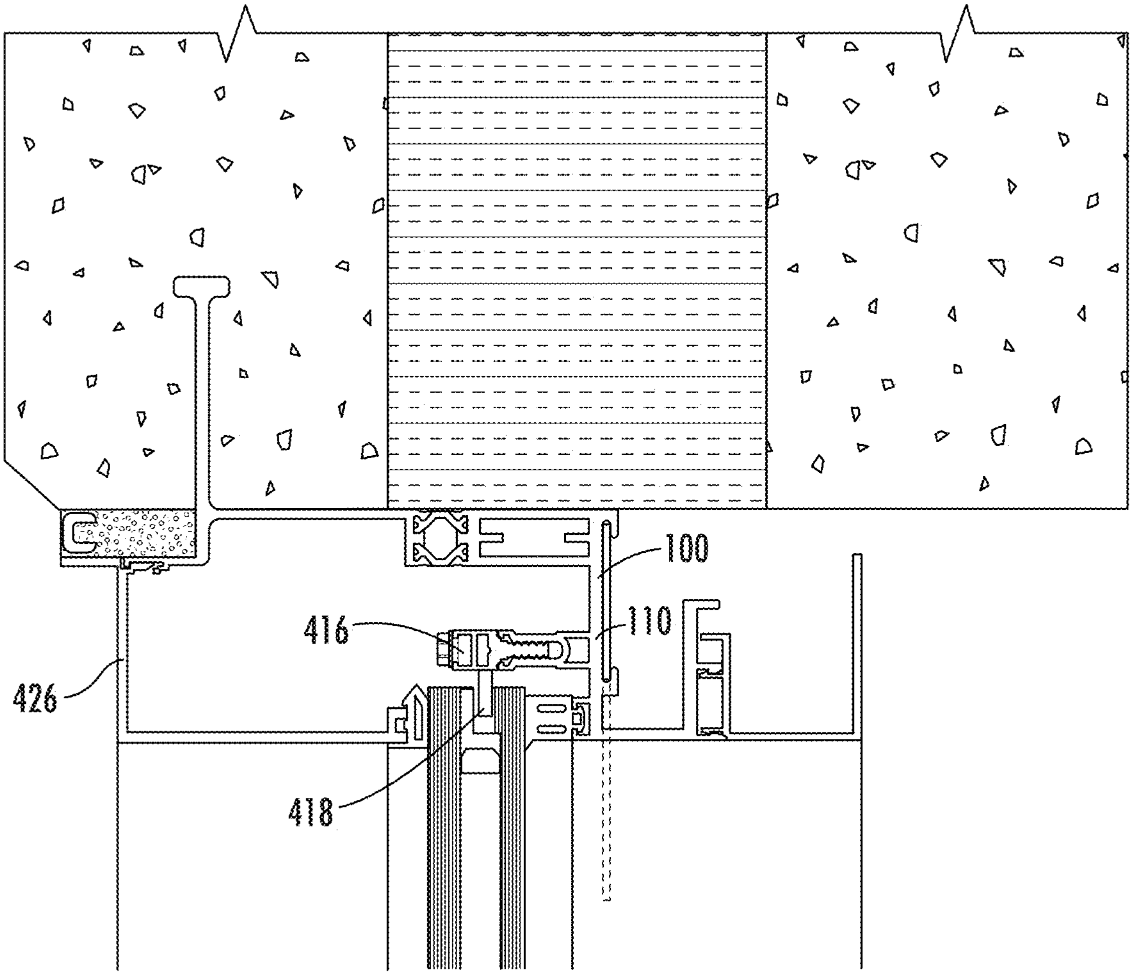
FIG. 16 illustrates a side cross-sectional view of a frame assembly embodiment secured to a head of a sandwich wall opening configured for exterior glazing.
Figure 17:
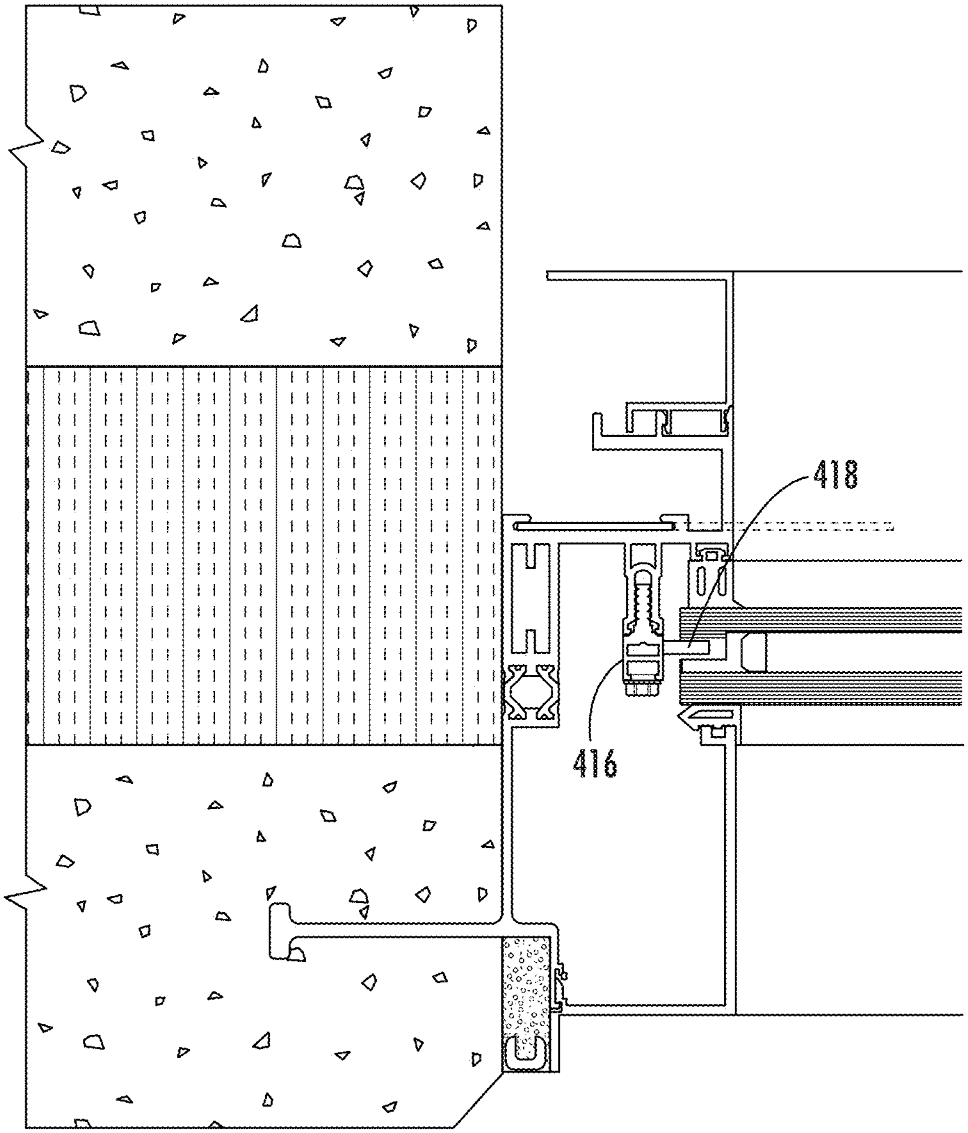
FIG. 17 illustrates a side cross-sectional view of a frame assembly embodiment secured to a jamb of sandwich wall opening configured for exterior glazing.

FIGS. 15-17 illustrate side cross-sectional views of a frame assembly embodiment secured to the sill, head and jambs, respectively, of a precast sandwich wall opening configured for exterior glazing. This embodiment is similar to the one illustrated in FIG. 10, however the window is configured for securing the glass toggle bolt 416 from the outside of the window. The bolt hole is defined on an exterior side of the lower frame portion 100. As the bolt is tightened into the bolt hole, the tab 418 advances with the bolt (to the right in FIGS. 10-12) and engages the inner pane of glass of the insulated glass unit to secure it in place. Then, snap on trim pieces 426, 422, and 424 can be secured by hand onto the lower frame portion for architectural aesthetics. Gasket 420A is fitted before the glass toggle bolt 416 is tightened and gasket 420B is fitted with the snap on trim piece 422.

In this embodiment, the window can be glazed from the exterior of the building. This can be advantageous as the glazer or installer does not need to be inside of the building during a renovation or repair and thus can avoid disturbing tenants as much as would be needed for interior glazing.

Figure 18:
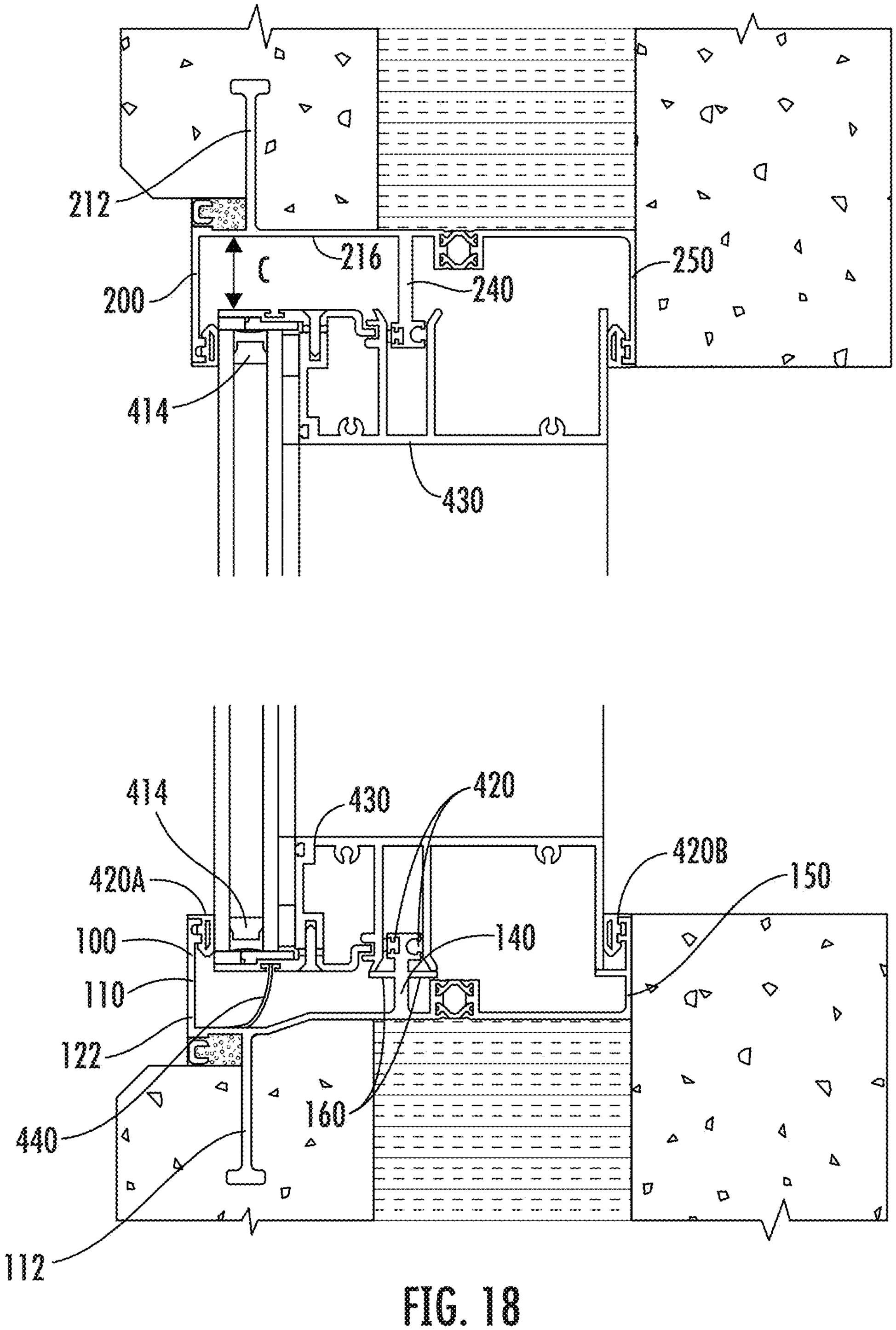
FIG. 18 illustrates a side cross-sectional view of a frame assembly embodiment secured to a sill and a head of a sandwich wall opening.
Figure 19:
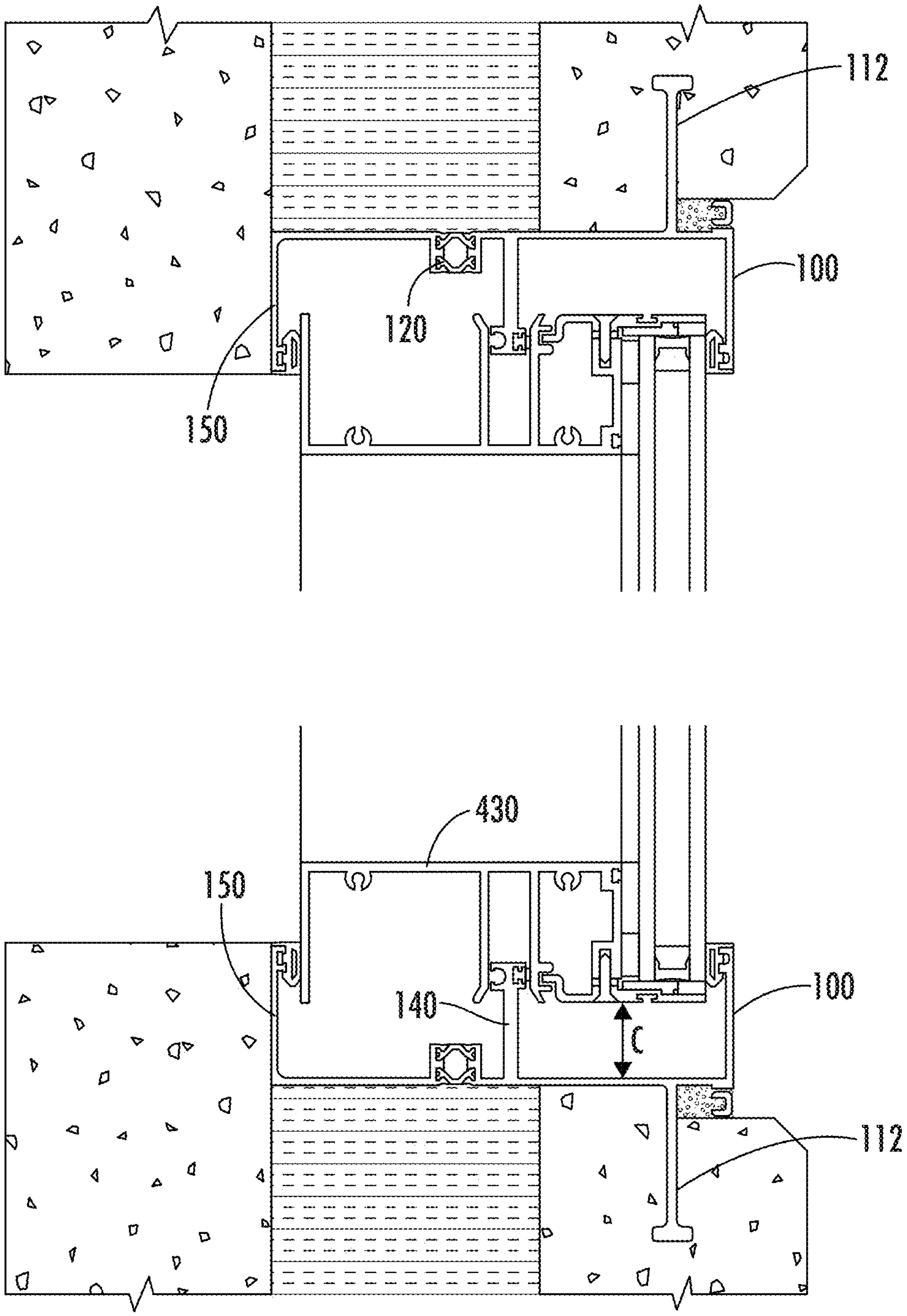
FIG. 19 illustrates a side cross-sectional view of a frame assembly embodiment secured to the jambs of a solid sandwich wall opening.

FIG. 18 illustrates a side cross-sectional view of a frame assembly embodiment being secured to a sill and a head of a sandwich wall opening. The lower frame portion 100 and upper frame portion 200 of this embodiment each include a front section 110, 210. One or both of a middle support 140, 240 and a rear support 150, 250 are provided as part of the frame assembly and maybe extruded with the frame portions as shown, or affixed thereto by some other method, either before or after the fenestration object is installed. At the head of the frame assembly, a clearance space C is provided between the top of the fenestration object (here, window 400) and the lower surface 216 of the upper frame portion 200. Similar clearance spaces C are provided in the head and jambs of the frame portion as shown in FIG. 19.

The window may be provided with a glass support frame 430 that is securely connected to the glass. The glass frame may be made of any sufficiently strong material such as aluminum, plastic etc. The glass support frame 430 may be connected to the recess between the panes of glass defined by a spacer 414, as discussed above, by way of a protrusion or the like provided on the glass frame that extends into the recess. The glass support frame 430 may further be connected by way of an adhesive to a perimeter of the inner pane of glass as illustrated in FIGS. 18 and 19. The glass support frame 430 can be advantageous in that it can be secured to the window in a factory-environment at the window manufacturer, and which makes installation of the window and the glass frame at the building site uncomplicated.

To install the window, the installer first inserts the window into the clearance space of the upper frame portion 200 and one of the jambs. The installer then lifts the window up and moves it laterally in one direction so as to place the corresponding window edges deeply into the corresponding clearance spaces. Then, the lower edge of the window and side edge opposite the inserted edge can be angled into the frame portions 100 of the sill and corresponding jamb and then lowered and moved laterally into place. In the embodiment shown here, two support flanges 160 support the weight of the window. Fewer or more support flanges or other supporting structure(s) may be provided to support the weight of the fenestration object. The window is then securely engaged between the front section of the frame portion and the middle 240 and rear 250 supports.

Although both the middle 240 and rear 250 supports are illustrated as engaging with the window and glass support frame 430, either of the supports may be eliminated according to embodiments. As with the capping portions and the tabs described above, each of the middle support 240 and rear support 250 may be configured to act as restraining members for engaging with a portion of the object opposite the frame portion (via the glass support frame 430) and thereby securely hold the object in place. One or both supports can be fitted with gaskets 420, and the middle support 240 may be provided with two gaskets or seals on opposite sides, sometimes referred to in the industry as a "chicken head," that engages both sides of a channel formed in the glass support frame 430 and further seals the window from water ingress.

A lip seal 440 may be provided to prevent ingress, but allow egress, of any water that may enter the frame portion 100. A weep in the form of one or more drain channels 122 through the front section 110 of the lower frame portion 100 can be provided in the lower front section 110 for allowing any water that bypasses the gaskets 420A, 420B to escape from the frame assembly.

Many modifications and other embodiments of the present disclosure set forth herein will come to mind to one skilled in the art to which this disclosure pertains having the benefit of the teachings presented in the foregoing description and the associated drawings. Therefore, it is to be understood that the present disclosure is not to be limited to specific embodiments disclosed and that modifications and other embodiments are intended to be included within the scope of the description. Moreover, although the foregoing description and the associated drawings describe example embodiments in the context of certain example combination of elements and/or functions, it should be appreciated, in light of the present disclosure, that different combinations of elements and/or functions than those explicitly described above are also contemplated as can be set forth in some of the description. Although specific terms are employed herein, they are used in a generic and descriptive sense only and not for purpose of limitation.

The invention claimed is:

1. A method of forming a precast concrete wall configured for securing an object thereto, the method comprising:

forming a mold framework configured to define a mold for molding wet concrete into a wall shape;

fitting a frame assembly for securing an object to the mold framework;

while fitting the frame assembly to the mold framework, extending a securing section of the frame assembly into the mold;

pouring concrete into the mold and allowing the concrete to at least partially surround the securing section;

allowing the concrete to dry; and, removing the precast concrete wall and securing section of the frame assembly from the mold.

2. The method of forming a precast concrete wall according to claim 1, wherein the method further comprises:

forming a first concrete wall portion in the mold by pouring concrete into the mold;

wherein the pouring step comprises allowing the concrete to at least partially surround the securing section;

applying an insulation material over the first concrete wall portion; and forming a second concrete wall portion in the mold by pouring concrete over the insulation material.

3. The method of forming a precast wall according to claim 2 further inserting a thermal break into the frame assembly.

4. The method of securing an object comprising:

forming a precast concrete wall according to claim 2; and, securing the object to the frame assembly.

* * * * *